US012212084B2

(12) United States Patent
Oosaka

(10) Patent No.: US 12,212,084 B2
(45) Date of Patent: Jan. 28, 2025

(54) BOARD-TO-BOARD CONNECTOR

(71) Applicant: Japan Aviation Electronics Industry, Ltd., Tokyo (JP)

(72) Inventor: Junji Oosaka, Tokyo (JP)

(73) Assignee: Japan Aviation Electronics Industry, Ltd., Tokyo (JP)

( * ) Notice: Subject to any disclaimer, the term of this patent is extended or adjusted under 35 U.S.C. 154(b) by 335 days.

(21) Appl. No.: 17/703,032

(22) Filed: Mar. 24, 2022

(65) Prior Publication Data

US 2022/0393376 A1 Dec. 8, 2022

(30) Foreign Application Priority Data

Jun. 3, 2021 (JP) ................................ 2021-093575

(51) Int. Cl.
*H01R 12/70* (2011.01)
*H01R 12/71* (2011.01)

(52) U.S. Cl.
CPC ......... *H01R 12/707* (2013.01); *H01R 12/716* (2013.01)

(58) Field of Classification Search
CPC ............................ H01R 12/707; H01R 12/716
USPC ...................................................... 439/74, 65
See application file for complete search history.

(56) References Cited

U.S. PATENT DOCUMENTS 5,378,160 A * 1/1995 Yumibe ................ H01R 12/714 439/74
6,027,345 A * 2/2000 McHugh ............ H01R 13/6585 439/74
6,984,130 B2 * 1/2006 Richter ................ H01R 12/716 439/74
2015/0244091 A1 8/2015 Naito
2020/0381856 A1 * 12/2020 Meng ................. H01R 13/6594
2021/0305734 A1 9/2021 Oosaka et al.
2021/0384658 A1 12/2021 Oosaka et al.

FOREIGN PATENT DOCUMENTS

JP 2006-156023 A 6/2006
JP 6872054 B1 5/2021
KR 2015-0101384 A 9/2015
KR 2020-0126665 A 11/2020

OTHER PUBLICATIONS

Korean Office Action in counterpart Korean Patent Application No. 2022-0047288 issued on Dec. 26, 2023, with English Translation.

* cited by examiner

*Primary Examiner* — Gary F Paumen
(74) *Attorney, Agent, or Firm* — Renner, Otto, Boisselle & Sklar, LLP

(57) ABSTRACT

A high voltage side hold-down includes a flat-plate shaped reinforcing plate part, a solder leg projecting downward from the reinforcing plate part, and a hold-down elastic piece supported like a cantilever beam by the reinforcing plate part. The hold-down elastic piece includes an elastic piece body, a contact part projecting upward beyond a CPU board opposed surface, and a displacement restriction part for restricting upward displacement of the contact part, sequentially from the base to the end of the hold-down elastic piece. A housing is formed in such a way that the contact part does not come into contact with the housing when the contact part is displaced downward and no longer projects upward beyond the CPU board opposed surface.

11 Claims, 20 Drawing Sheets

BOARD-TO-BOARD CONNECTOR

INCORPORATION BY REFERENCE

This application is based upon and claims the benefit of priority from Japanese patent application No. 2021-093575, filed on Jun. 3, 2021, the disclosure of which is incorporated herein in its entirety by reference.

BACKGROUND

The present disclosure relates to a board-to-board connector.

As shown in FIG. 20 of this application, Patent Literature 1 (Japanese Unexamined Patent Application Publication No. 2006-156023) discloses a receptacle 103 including a receptacle contactor 100, an insulating housing 101 that accommodates the receptacle contactor 100, and a receptacle fixing plate 102 that fixes the insulating housing 101 to a board.

The receptacle fixing plate 102 includes a fixing leg 104 and a receptacle contact part 105. In the receptacle contact part 105, a contact piece 106A and a contact piece 106B are formed by cutting and bending.

SUMMARY

In the case where a hold-down is provided with an elastic piece having a contact part, there is a possibility that elastic displacement of the contact part is hindered by the housing. Further, it is necessary to prevent curling deformation of an elastic piece.

An object of the present disclosure is to provide a technique to achieve a structure in which a contact part of an elastic piece provided in a hold-down is easily elastically displaceable and prevent curling deformation of the elastic piece.

According to an aspect of the present invention, there is provided a board-to-board connector to be mounted on a first board and interposed between the first board and a second board to electrically connect a plurality of pads of the first board to a plurality of pads of the second board, including a flat-plate housing; a plurality of contacts held on the housing; and a hold-down made of metal, wherein the housing includes a housing lower surface to be opposed to the first board when the board-to-board connector is mounted on the first board and a housing upper surface being an opposite of the housing lower surface, a hold-down accommodation recess is formed on the housing upper surface, the hold-down includes a flat-plate reinforcing plate part to be accommodated in the hold-down accommodation recess and cover an inner bottom surface of the hold-down accommodation recess; a solder leg projecting downward from the reinforcing plate part; and a hold-down elastic piece supported like a cantilever beam by the reinforcing plate part, the hold-down elastic piece includes, sequentially from a base to an end of the hold-down elastic piece, an elastic piece body; a contact part projecting upward beyond the housing upper surface; and a displacement restriction part to restrict upward displacement of the contact part, and the housing is formed in such a way that the contact part does not come into contact with the housing when the contact part is displaced downward and no longer projects upward beyond the housing upper surface.

The present disclosure achieves a structure in which a contact part of an elastic piece provided in a hold-down is easily elastically displaceable and prevents curling deformation of the elastic piece.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

First Embodiment

Figure 1:
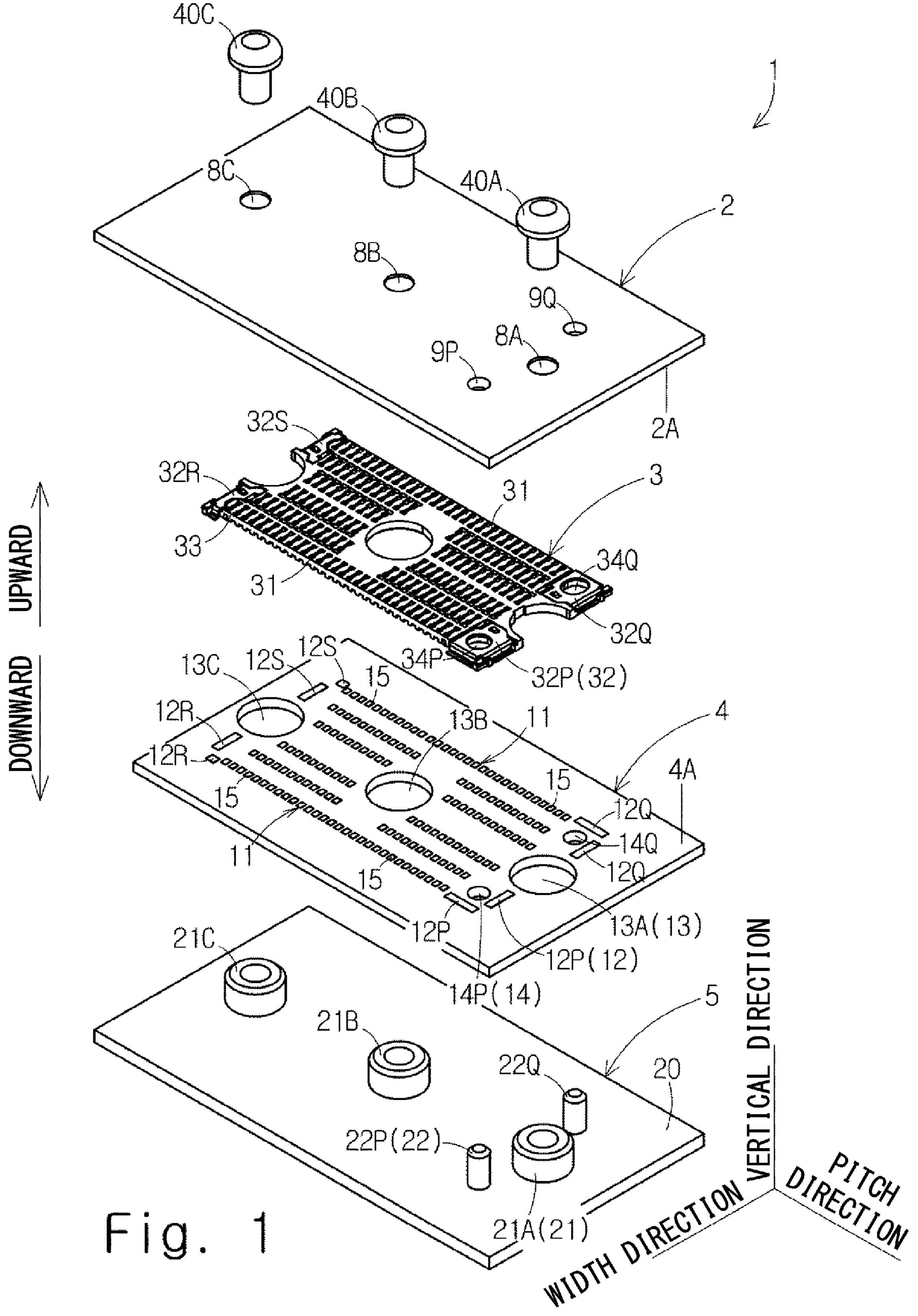
FIG. 1 is an exploded perspective view of an information processing device (first embodiment)

A first embodiment is described hereinafter with reference to FIGS. 1 to 16. FIG. 1 is an exploded perspective view of an information processing device 1. As shown in FIG. 1, the information processing device 1 includes a CPU board 2 (second board), a connector 3 (board-to-board connector), an input/output board 4 (first board), and a support board 5. The CPU board 2, the connector 3, the input/output board 4, and the support board 5 are placed on top of one another in this recited order. Specifically, the connector 3 is disposed between the CPU board 2 and the input/output board 4.

The CPU board 2 and the input/output board 4 are rigid boards such as a paper phenolic board or a glass epoxy board, for example.

Figure 2:
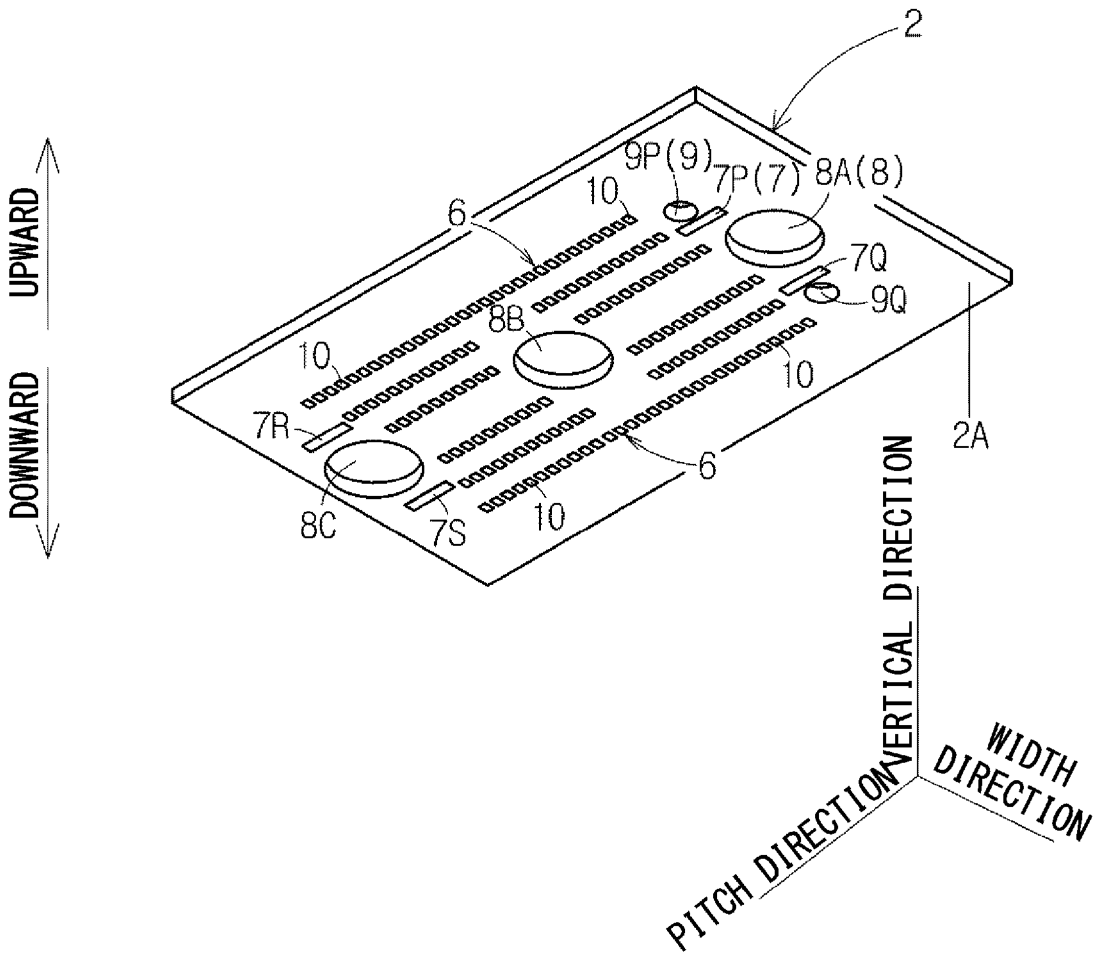
FIG. 2 is a perspective view of a CPU board viewed from another angle (first embodiment)

FIG. 2 is a perspective view of the CPU board 2 viewed from another angle. As shown in FIGS. 1 and 2, the CPU board 2 includes a connector opposed surface 2A to be opposed to the connector 3. As shown in FIG. 2, a plurality of signal pad rows 6 and a plurality of power supply pads 7 are formed on the connector opposed surface 2A. Further, the CPU board 2 has a plurality of bolt fastening holes 8 and a plurality of positioning holes 9.

The plurality of signal pad rows 6 extend parallel to one another. Each of the signal pad rows 6 includes a plurality of signal pads 10. The longitudinal direction of each signal pad row 6 is referred to as a pitch direction. Further, the direction orthogonal to the pitch direction is defined as a width direction. The plurality of signal pad rows 6 are arranged in the width direction. The thickness direction of the CPU board 2 is orthogonal to the pitch direction and the width direction, and it is referred to hereinafter as a vertical direction. The vertical direction includes downward which the connector opposed surface 2A faces, and upward opposite to downward. Note that the vertical direction, the upward direction, and the downward direction are directions used by way of illustration only and should not be interpreted as limiting the posture of the information processing device 1 and the connector 3 when they are actually used.

The plurality of bolt fastening holes 8 are disposed separately from each other in the pitch direction. The plurality of bolt fastening holes 8 include a first bolt fastening hole 8A, a second bolt fastening hole 8B, and a third bolt fastening hole 8C. The first bolt fastening hole 8A, the second bolt fastening hole 8B, and the third bolt fastening hole 8C are arranged in this recited order.

The plurality of positioning holes 9 include a first positioning hole 9P and a second positioning hole 9Q. The first positioning hole 9P and the second positioning hole 9Q are disposed separately from each other in the width direction. The first positioning hole 9P and the second positioning hole 9Q are disposed in such a way that the first bolt fastening hole 8A is interposed therebetween in the width direction.

The plurality of power supply pads 7 include a high voltage side electrode pad 7P, a high voltage side electrode pad 7Q, a low voltage side electrode pad 7R, and a low voltage side electrode pad 7S. Any of the plurality of power supply pads 7 may serve as a high voltage side or a low voltage side.

The high voltage side electrode pad 7P and the high voltage side electrode pad 7Q are disposed separately from each other in the width direction. The high voltage side electrode pad 7P and the high voltage side electrode pad 7Q are disposed in such a way that the first bolt fastening hole 8A is interposed therebetween in the width direction. The high voltage side electrode pad 7P is disposed between the first bolt fastening hole 8A and the first positioning hole 9P in the width direction. The high voltage side electrode pad 7Q is disposed between the first bolt fastening hole 8A and the second positioning hole 9Q in the width direction. Note that, however, the pattern shapes and positions of the high voltage side electrode pad 7P and the high voltage side electrode pad 7Q are arbitrary, and the high voltage side electrode pad 7P and the high voltage side electrode pad 7Q may be formed in a ring to surround the first positioning hole 9P and the second positioning hole 9Q, respectively.

The low voltage side electrode pad 7R and the low voltage side electrode pad 7S are disposed separately from each other in the width direction. The low voltage side electrode pad 7R and the low voltage side electrode pad 7S are disposed in such a way that the third bolt fastening hole 8C is interposed therebetween in the width direction. Note that, however, the pattern shapes and positions of the low voltage side electrode pad 7R and the low voltage side electrode pad 7S are arbitrary.

Referring back to FIG. 1, the input/output board 4 includes a connector opposed surface 4A to be opposed to the connector 3. A plurality of signal pad rows 11 and a plurality of power supply pads 12 are formed on the connector opposed surface 4A. Further, the input/output board 4 has a plurality of bolt fastening holes 13 and a plurality of positioning holes 14.

The plurality of signal pad rows 11 extend parallel to one another. The plurality of signal pad rows 11 are arranged in the width direction. Each of the signal pad rows 11 includes a plurality of signal pads 15.

The plurality of bolt fastening holes 13 are disposed separately from each other in the pitch direction. The plurality of bolt fastening holes 13 include a first bolt fastening hole 13A, a second bolt fastening hole 13B, and a third bolt fastening hole 13C. The first bolt fastening hole 13A, the second bolt fastening hole 13B, and the third bolt fastening hole 13C are arranged in this recited order.

The plurality of positioning holes 14 include a first positioning hole 14P and a second positioning hole 14Q. The first positioning hole 14P and the second positioning hole 14Q are disposed separately from each other in the width direction. The first positioning hole 14P and the second positioning hole 14Q are disposed in such a way that the first bolt fastening hole 13A is interposed therebetween in the width direction.

The plurality of power supply pads 12 include a pair of high voltage side electrode pads 12P, a pair of high voltage side electrode pads 12Q, a pair of low voltage side electrode pads 12R, and a pair of low voltage side electrode pads 12S.

The pair of high voltage side electrode pads 12P are disposed in such a way that one of them is adjacent to the first positioning hole 14P in the pitch direction, and the other one is adjacent to the first positioning hole 14P in the width direction. The pair of high voltage side electrode pads 12Q are disposed in such a way that one of them is adjacent to the second positioning hole 14Q in the pitch direction, and the other one is adjacent to the second positioning hole 14Q in the width direction. The pair of low voltage side electrode pads 12R and the pair of low voltage side electrode pads 12S are disposed in such a way that the third bolt fastening hole 13C is interposed therebetween in the width direction. Thus, the pair of low voltage side electrode pads 12R, the third bolt fastening hole 13C, and the pair of low voltage side electrode pads 12S are disposed in this recited order in the width direction.

The support board 5 is typically a part of a casing that accommodates the CPU board 2, the connector 3, and the input/output board 4, and it is made of aluminum or aluminum alloy, for example. The support board 5 includes a flat-plate board main body 20, a plurality of nuts 21, and a plurality of cylindrical positioning pins 22. The plurality of nuts 21 and the plurality of positioning pins 22 project upward from the board main body 20.

The plurality of nuts 21 include a first nut 21A, a second nut 21B, and a third nut 21C. The first nut 21A, the second nut 21B, and the third nut 21C are disposed to correspond to the first bolt fastening hole 13A, the second bolt fastening hole 13B, and the third bolt fastening hole 13C of the input/output board 4, respectively.

The plurality of positioning pins 22 include a first positioning pin 22P and a second positioning pin 22Q. The first positioning pin 22P and the second positioning pin 22Q are disposed to correspond to the first positioning hole 14P and the second positioning hole 14Q of the input/output board 4, respectively.

Figure 3:
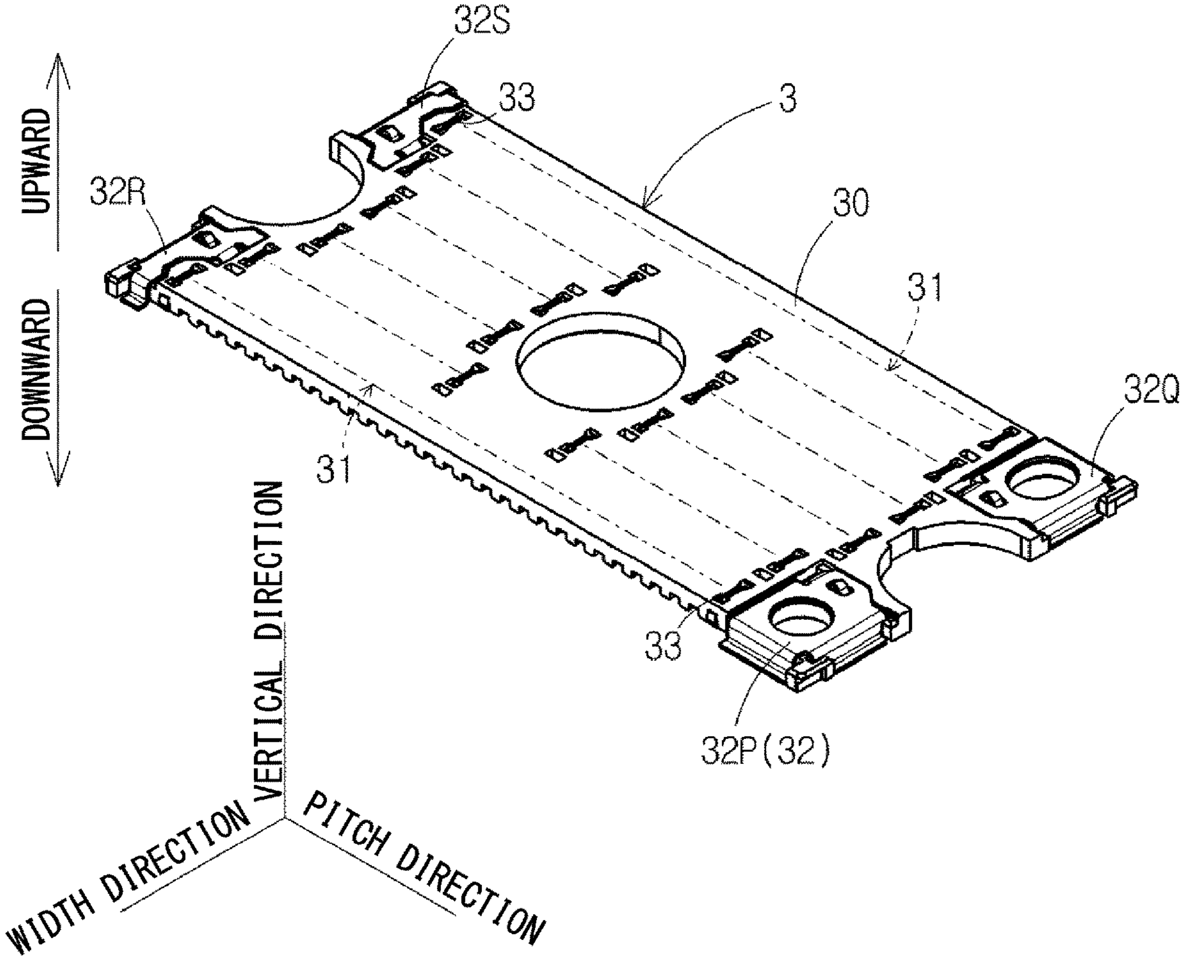
FIG. 3 is a perspective view of a connector (first embodiment)
Figure 4:
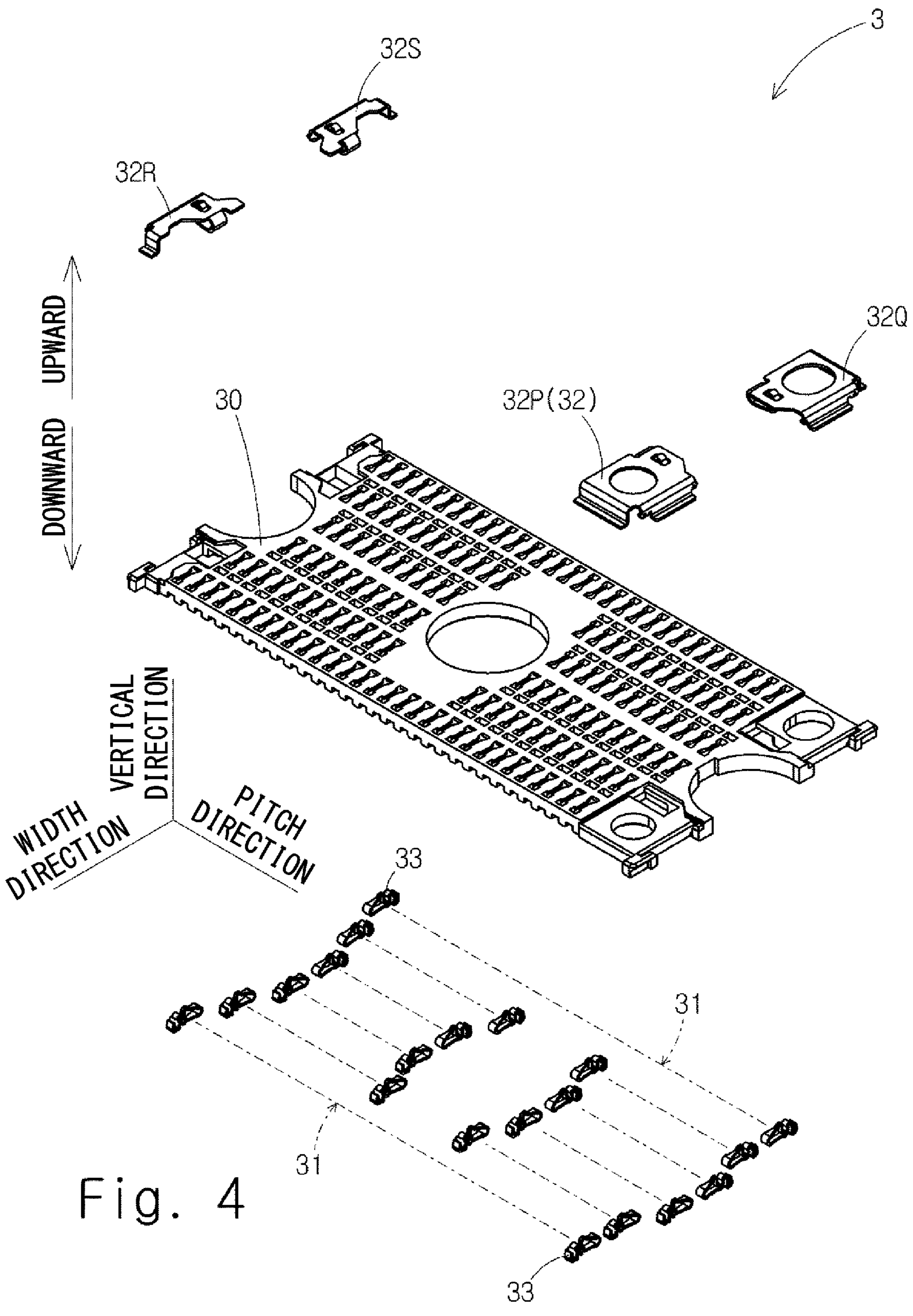
FIG. 4 is an exploded perspective view of the connector (first embodiment)

The connector 3 is mountable on the connector opposed surface 4A of the input/output board 4. FIG. 3 is a perspective view of the connector 3. FIG. 4 is an exploded perspective view of the connector 3. As shown in FIGS. 3 and 4, the connector 3 includes a rectangular flat-plate housing 30 made of insulating resin, a plurality of contact rows 31, and a plurality of hold-downs 32 made of metal. The plurality of contact rows 31 and the plurality of hold-downs 32 are held on the housing 30.

The plurality of contact rows 31 extend parallel to one another. The plurality of contact rows 31 are arranged in the width direction. The plurality of contact rows 31 extend in the pitch direction. Each contact row 31 includes a plurality of contacts 33 made of metal. Each contact 33 is formed by punching and bending a metal plate formed by plating copper or copper alloy, for example.

The plurality of hold-downs 32 include a high voltage side hold-down 32P, a high voltage side hold-down 32Q, a low voltage side hold-down 32R, and a low voltage side hold-down 32S. As shown in FIG. 1, the high voltage side hold-down 32P, the high voltage side hold-down 32Q, the low voltage side hold-down 32R, and the low voltage side hold-down 32S are disposed to correspond to the high voltage side electrode pads 12P, the high voltage side electrode pads 12Q, the low voltage side electrode pads 12R, and the low voltage side electrode pads 12S of the input/output board 4, respectively. Each hold-down 32 is formed by punching and bending a metal plate such as a stainless steel plate, for example.

Figure 5:
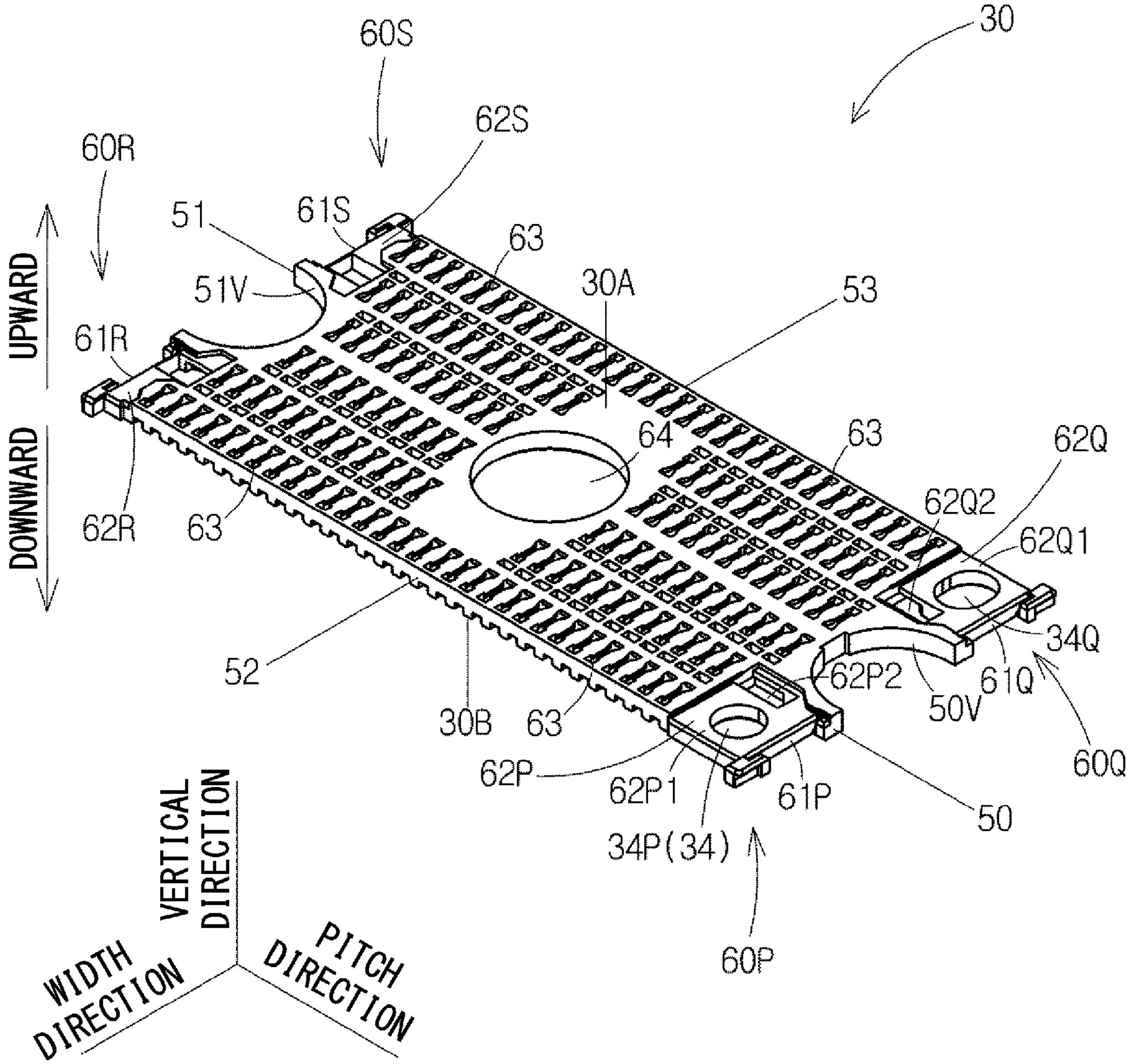
FIG. 5 is a perspective view of a housing (first embodiment)

FIG. 5 is a perspective view of the housing 30. As shown in FIG. 5, the housing 30 includes a CPU board opposed surface 30A serving as a housing upper surface that can be opposed to the CPU board 2 by facing upward, and an input/output board opposed surface 30B serving as a housing lower surface that can be opposed to the input/output board 4 by facing downward. The CPU board opposed surface 30A is the uppermost surface of the housing 30. The input/output board opposed surface 30B is the lowermost surface of the housing 30. The housing 30 has a plurality of positioning holes 34. The plurality of positioning holes 34 include a first positioning hole 34P and a second positioning hole 34Q. The first positioning hole 34P and the second positioning hole 34Q are formed to penetrate the housing 30 in the vertical direction.

Referring back to FIG. 1, the overview of the assembly procedure of the information processing device 1 is described.

First, the connector 3 is mounted on the input/output board 4. To be specific, the plurality of contact rows 31 are respectively soldered to the plurality of corresponding signal pad rows 11, and further the plurality of hold-downs 32 are respectively soldered to the plurality of corresponding power supply pads 12.

Next, the input/output board 4 on which the connector 3 is mounted is attached to the support board 5. At this time, the first nut 21A, the second nut 21B, and the third nut 21C of the support board 5 penetrate the first bolt fastening hole 13A, the second bolt fastening hole 13B, and the third bolt fastening hole 13C of the input/output board 4, respectively. Likewise, the first positioning pin 22P penetrates the first positioning hole 14P of the input/output board 4 and the first positioning hole 34P of the connector 3 in this recited order, and the second positioning pin 22Q penetrates the second positioning hole 14Q of the input/output board 4 and the second positioning hole 34Q of the connector 3 in this recited order.

Then, the CPU board 2 is attached to the support board 5 in such a way that the CPU board 2 overlaps the connector 3. At this time, the first positioning pin 22P and the second positioning pin 22Q penetrate the first positioning hole 9P and the second positioning hole 9Q of the CPU board 2, respectively. In this state, a first bolt 40A is fastened to the first nut 21A through the first bolt fastening hole 8A and the first bolt fastening hole 13A, a second bolt 40B is fastened to the second nut 21B through the second bolt fastening hole 8B and the second bolt fastening hole 13B, and a third bolt 40C is fastened to the third nut 21C through the third bolt fastening hole 8C and the third bolt fastening hole 13C. In this manner, the connector 3 is interposed between the CPU board 2 and the input/output board 4, and thereby the plurality of signal pads 15 of the input/output board 4 and the plurality of signal pads 10 of the CPU board 2 shown in FIG. 2 are respectively electrically connected through the plurality of contacts 33 of the connector 3. Likewise, the plurality of power supply pads 12 of the input/output board 4 and the plurality of power supply pads 7 of the CPU board 2 shown in FIG. 2 are respectively electrically connected through the plurality of hold-downs 32. In this way, the plurality of hold-downs 32 of the connector 3 are used to supply power from the input/output board 4 to the CPU board 2 in this embodiment.

Further, the first positioning pin 22P is inserted into the first positioning hole 34P of the connector 3 and the first positioning hole 9P of the CPU board 2, and the second positioning pin 22Q is inserted into the second positioning hole 34Q of the connector 3 and the second positioning hole 9Q of the CPU board 2, and thereby highly accurate positioning of the CPU board 2 with respect to the connector 3 is achieved.

The connector 3 is described hereinafter in further detail.

As shown in FIG. 5, the housing 30 is formed in a rectangular flat-plate shape. Specifically, the housing 30 includes a first pitch side surface 50, a second pitch side surface 51, a first width side surface 52, and a second width side surface 53. The first pitch side surface 50 and the second pitch side surface 51 are side surfaces orthogonal to the pitch direction. The first pitch side surface 50 and the second pitch side surface 51 are surfaces opposed to each other. The first width side surface 52 and the second width side surface 53 are side surfaces orthogonal to the width direction. The first width side surface 52 and the second width side surface 53 are surfaces opposed to each other.

The housing 30 further includes a first corner part 60P, a second corner part 60Q, a third corner part 60R, and a fourth corner part 60S. The first corner part 60P is a corner at which the first pitch side surface 50 and the first width side surface 52 intersect. The second corner part 60Q is a corner at which the first pitch side surface 50 and the second width side surface 53 intersect. The third corner part 60R is a corner at which the second pitch side surface 51 and the first width side surface 52 intersect. The fourth corner part 60S is a corner at which the second pitch side surface 51 and the second width side surface 53 intersect. Thus, the first corner part 60P and the fourth corner part 60S are located at diagonal positions of the rectangular housing 30 when viewed from above. Likewise, the second corner part 60Q and the third corner part 60R are located at diagonal positions of the rectangular housing 30 when viewed from above. The above-described first positioning hole 34P is formed at the first corner part 60P. The second positioning hole 34Q is formed at the second corner part 60Q. The housing 30 has only two positioning holes, i.e., the first positioning hole 34P and the second positioning hole 34Q, as positioning holes to be used for positioning of the CPU board 2 with respect to the connector 3.

On the first pitch side surface 50, a press-fit groove 61P, a nut notch 50V, and a press-fit groove 61Q are formed in this recited order from the first width side surface 52 to the second width side surface 53.

On the second pitch side surface 51, a press-fit groove 61R, a nut notch 51V, and a press-fit groove 61S are formed in this recited order from the first width side surface 52 to the second width side surface 53.

On the CPU board opposed surface 30A, a hold-down accommodation recess 62P, a hold-down accommodation recess 62Q, a hold-down accommodation recess 62R, and a hold-down accommodation recess 62S are formed.

On the housing 30, a plurality of contact accommodation parts 63 and a nut penetrating hole 64 are further formed.

As shown in FIGS. 4 and 5, the high voltage side hold-down 32P, the high voltage side hold-down 32Q, the low voltage side hold-down 32R, and the low voltage side hold-down 32S are press-fit into the press-fit groove 61P, the press-fit groove 61Q, the press-fit groove 61R, and the press-fit groove 61S, respectively, and thereby held by the housing 30.

The nut notch 50V is a notch for avoiding the physical interference between the first nut 21A shown in FIG. 1 and the housing 30. The nut penetrating hole 64 is a notch for avoiding the physical interference between the second nut 21B shown in FIG. 1 and the housing 30. The nut notch 51V is a notch for avoiding the physical interference between the third nut 21C shown in FIG. 1 and the housing 30.

Referring back to FIG. 5, the hold-down accommodation recess 62P, the hold-down accommodation recess 62Q, the hold-down accommodation recess 62R, and the hold-down accommodation recess 62S are formed at the first corner part 60P, the second corner part 60Q, the third corner part 60R, and the fourth corner part 60S, respectively.

The hold-down accommodation recess 62P includes an inner bottom surface 62P1. The hold-down accommodation recess 62P is formed to surround the first positioning hole 34P. Thus, the first positioning hole 34P is formed on the inner bottom surface 62P1 of the hold-down accommodation recess 62P. The inner bottom surface 62P1 of the hold-down accommodation recess 62P further has an insertion hole 62P2 that penetrates it in the vertical direction. The insertion hole 62P2 is formed apart from the first positioning hole 34P in the width direction.

The hold-down accommodation recess 62Q includes an inner bottom surface 62Q1. The hold-down accommodation recess 62Q is formed to surround the second positioning hole 34Q. Thus, the second positioning hole 34Q is formed on the inner bottom surface 62Q1 of the hold-down accommodation recess 62Q. The inner bottom surface 62Q1 of the hold-down accommodation recess 62Q further has an insertion hole 62Q2 that penetrates it in the vertical direction. The insertion hole 62Q2 is formed apart from the second positioning hole 34Q in the width direction.

The inner bottom surface 62P1 of the hold-down accommodation recess 62P and the inner bottom surface 62Q1 of the hold-down accommodation recess 62Q are planes that are parallel to the CPU board opposed surface 30A and located lower than the CPU board opposed surface 30A.

Each of the contact accommodation parts 63 is a part that accommodates each of the contacts 33. Each of the contact accommodation parts 63 is formed to penetrate the housing 30 in the vertical direction.

Figure 6:
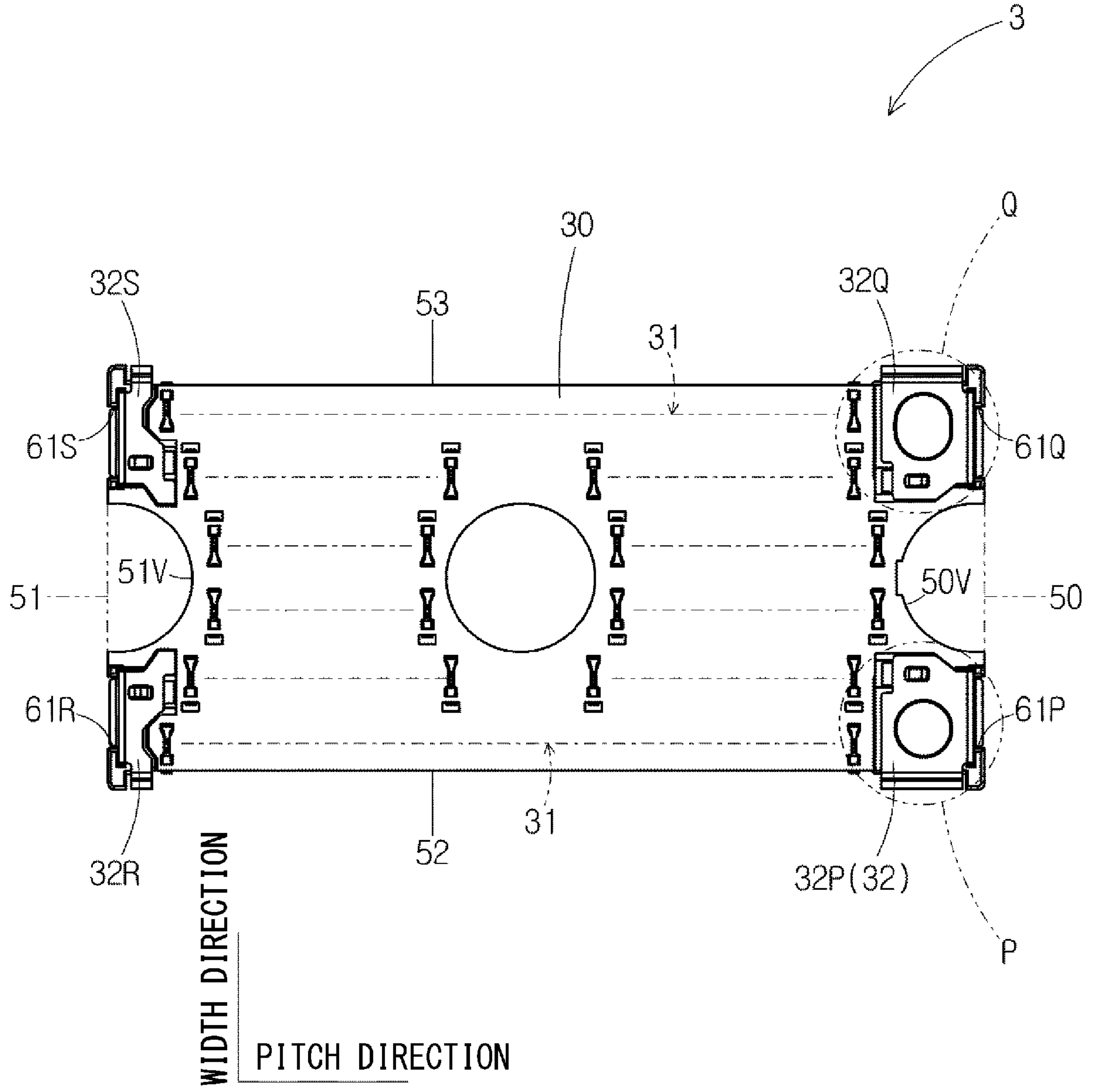
FIG. 6 is a plan view of the connector (first embodiment)

FIG. 6 shows the connector 3 viewed from above. As shown in FIG. 6, the press-fit groove 61P and the like are formed on the first pitch side surface 50. Thus, the first pitch side surface 50 exists in a discontinuous manner in the width direction. For the following description, a part of the first pitch side surface 50 which is missing due to the formation of the press-fit groove 61P or the like is indicated by a chain double-dashed line, and the first pitch side surface 50 is specified by drawing a leader line of the first pitch side surface 50 from this chain double-dashed line.

Likewise, the press-fit groove 61R and the like are formed on the second pitch side surface 51. Thus, the second pitch side surface 51 exists in a discontinuous manner in the width direction. For the following description, a part of the second pitch side surface 51 which is missing due to the formation of the press-fit groove 61R or the like is indicated by a chain double-dashed line, and the second pitch side surface 51 is specified by drawing a leader line of the second pitch side surface 51 from this chain double-dashed line.

As shown in FIG. 6, the plurality of contact rows 31 extend from the first pitch side surface 50 to the second pitch side surface 51.

Figure 7:
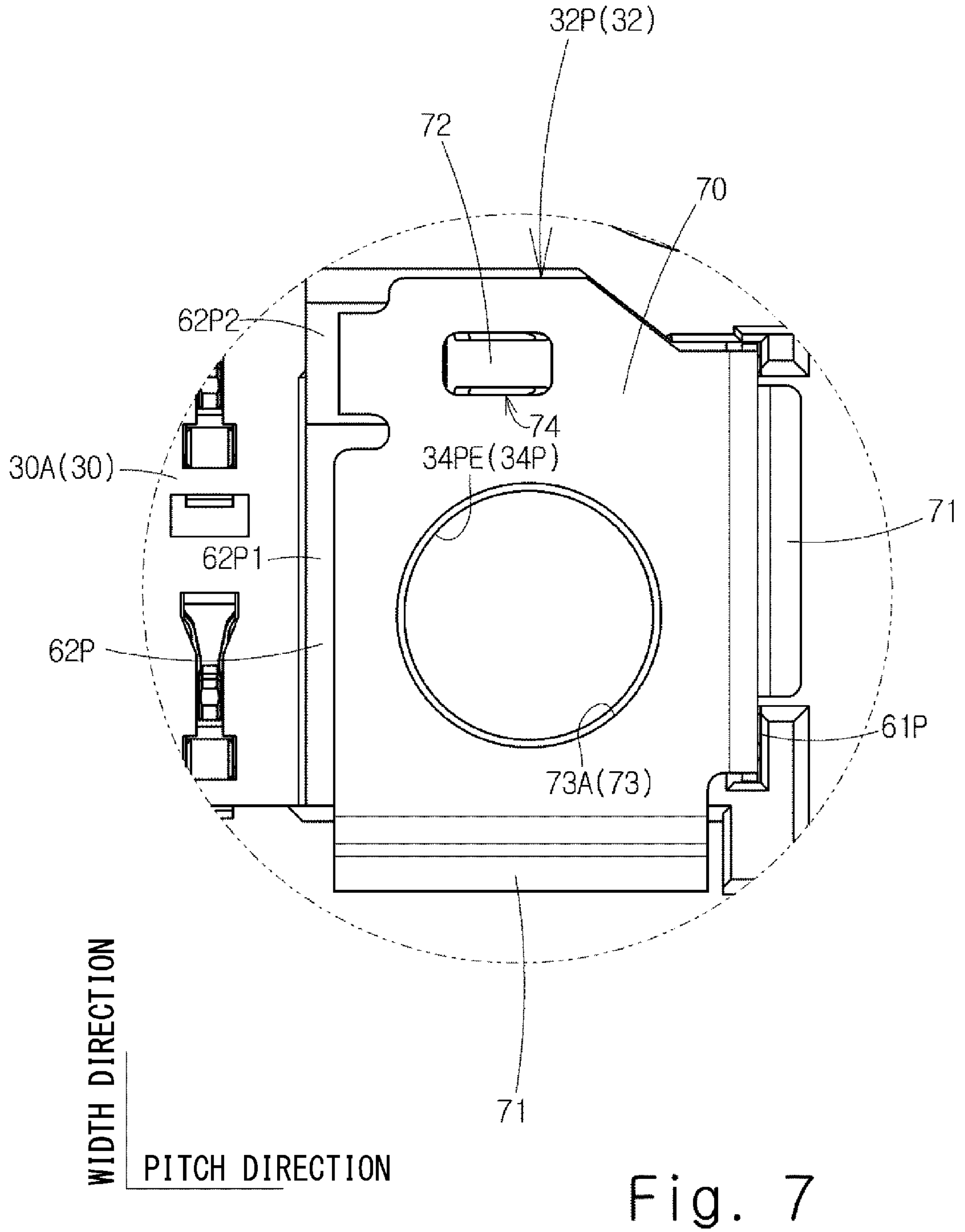
FIG. 7 is an enlarged view of a part P in FIG. 6 (first embodiment)
Figure 8:
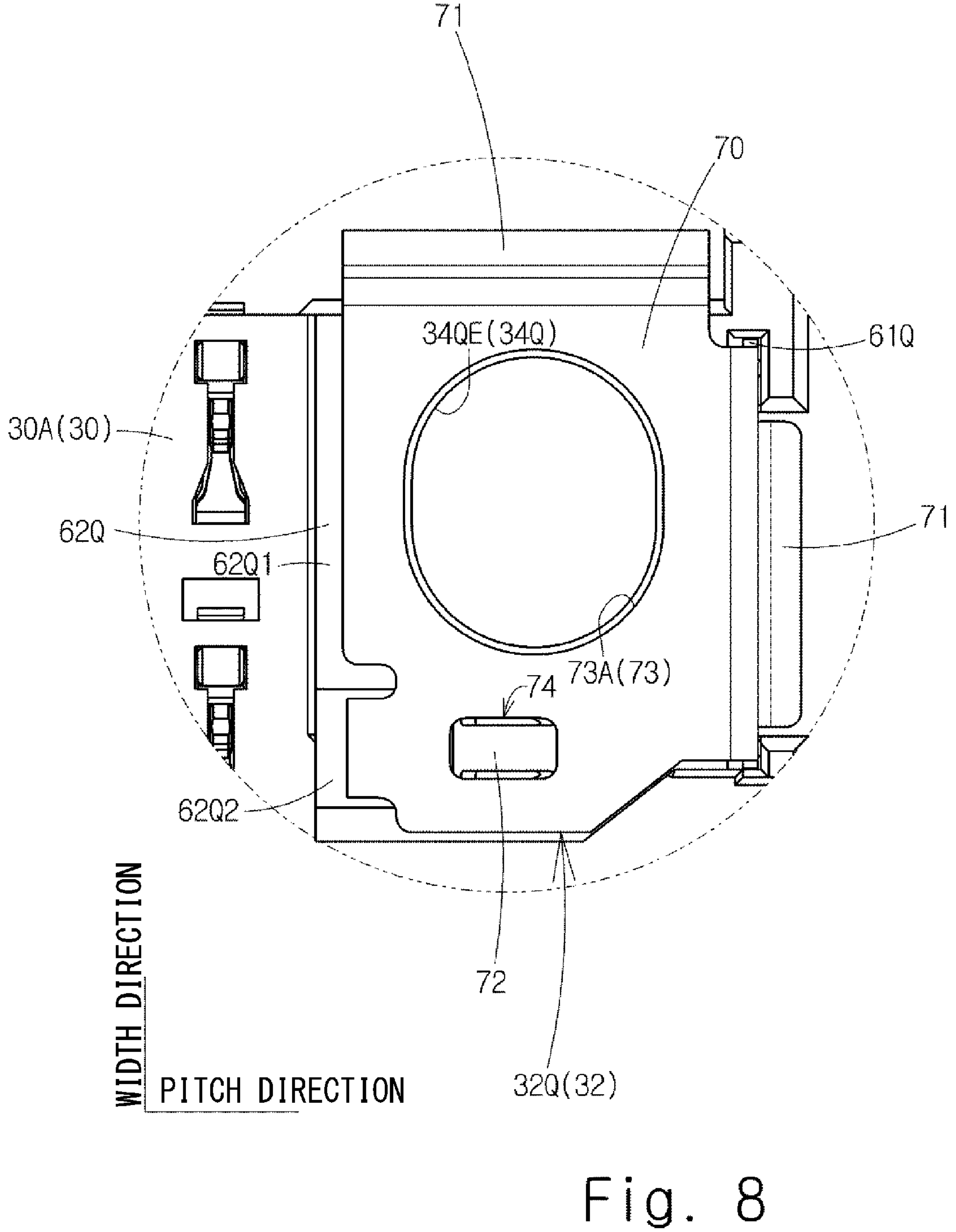
FIG. 8 is an enlarged view of a part Q in FIG. 6 (first embodiment)

The first positioning hole 34P, the second positioning hole 34Q, the high voltage side hold-down 32P, the high voltage side hold-down 32Q, the low voltage side hold-down 32R, and the low voltage side hold-down 32S are hereinafter described in further detail with reference to FIGS. 7 to 12. FIG. 7 is an enlarged view of the part P in FIG. 6. FIG. 8 is an enlarged view of the part Q in FIG. 6.

As shown in FIG. 7, the first positioning hole 34P is a round hole that penetrates the housing 30 in the vertical direction, and it has an inner edge 34PE.

The high voltage side hold-down 32P includes a reinforcing plate part 70, two solder legs 71, and a hold-down elastic piece 72.

The reinforcing plate part 70 is flat-plate shaped, and it is accommodated in the hold-down accommodation recess 62P and coverts the inner bottom surface 62P1 of the hold-down accommodation recess 62P. The reinforcing plate part 70 has a positioning penetrating hole 73 and an elastic piece insertion hole 74.

The reinforcing plate part 70 covers the inner bottom surface 62P1 of the hold-down accommodation recess 62P around the first positioning hole 34P. To be specific, the reinforcing plate part 70 is formed not to cover the inner edge 34PE of the first positioning hole 34P. Specifically, the inner edge 34PE of the first positioning hole 34P is located inside an inner edge 73A of the positioning penetrating hole 73 of the reinforcing plate part 70 when viewed from above. The reinforcing plate part 70 made of metal thereby does not hinder the positioning function of the inner edge 34PE of the first positioning hole 34P and the first positioning pin 22P. Further, the reinforcing plate part 70 made of metal reduces the amount of deformation when the first positioning hole 34P is deformed outward in the radial direction due to contact with the first positioning pin 22P, which avoids a significant decrease in positioning accuracy by the positioning function.

Each of the two solder legs 71 projects downward from the reinforcing plate part 70 toward the input/output board 4 and is soldered to the corresponding power supply pad 12 of the input/output board 4 shown in FIG. 1. Thus, the two solder legs 71 are formed to project downward beyond the input/output board opposed surface 30B of the housing 30. One of the two solder legs 71 is press-fit into the press-fit groove 61P, and the high voltage side hold-down 32P is thereby held by the housing 30.

The hold-down elastic piece 72 is supported like a cantilever beam by the reinforcing plate part 70. The hold-down elastic piece 72 is accommodated in the insertion hole 62P2 of the hold-down accommodation recess 62P. The hold-down elastic piece 72 is located below the reinforcing plate part 70. The details of the hold-down elastic piece 72 are described later.

As shown in FIG. 8, the second positioning hole 34Q is a slotted hole that penetrates the housing 30 in the vertical direction, and it has an inner edge 34QE.

The high voltage side hold-down 32Q includes a reinforcing plate part 70, two solder legs 71, and a hold-down elastic piece 72, just like the high voltage side hold-down 32P.

The reinforcing plate part 70 is flat-plate shaped, and it is accommodated in the hold-down accommodation recess 62Q and coverts the inner bottom surface 62Q1 of the hold-down accommodation recess 62Q. The reinforcing plate part 70 has a positioning penetrating hole 73 and an elastic piece insertion hole 74.

The reinforcing plate part 70 is disposed to cover the inner bottom surface 62Q1 of the hold-down accommodation recess 62Q around the second positioning hole 34Q. To be specific, the reinforcing plate part 70 is formed not to cover the inner edge 34QE of the second positioning hole 34Q. Specifically, the inner edge 34QE of the second positioning hole 34Q is located inside an inner edge 73A of the positioning penetrating hole 73 of the reinforcing plate part 70 when viewed from above. The reinforcing plate part 70 made of metal thereby does not hinder the positioning function of the inner edge 34QE of the second positioning hole 34Q and the second positioning pin 22Q. Further, the reinforcing plate part 70 made of metal reduces the amount of deformation when the second positioning hole 34Q is deformed outward in the radial direction due to contact with the second positioning pin 22Q, which avoids a significant decrease in positioning accuracy by the positioning function.

Each of the two solder legs 71 projects downward from the reinforcing plate part 70 toward the input/output board 4 and is soldered to the corresponding power supply pad 12 of the input/output board 4 shown in FIG. 1. Thus, the two solder legs 71 are formed to project downward beyond the input/output board opposed surface 30B of the housing 30. One of the two solder legs 71 is press-fit into the press-fit groove 61Q, and the high voltage side hold-down 32Q is thereby held by the housing 30.

The hold-down elastic piece 72 is supported like a cantilever beam by the reinforcing plate part 70. The hold-down elastic piece 72 is accommodated in the insertion hole 62Q2 of the hold-down accommodation recess 62Q. The hold-down elastic piece 72 is located below the reinforcing plate part 70. The details of the hold-down elastic piece 72 are described later.

The low voltage side hold-down 32R and the low voltage side hold-down 32S shown in FIG. 6 are formed to be almost symmetric with the high voltage side hold-down 32P and the high voltage side hold-down 32Q, respectively, in the pitch direction. Note that, however, the positioning penetrating hole 73 shown in FIGS. 7 and 8 is omitted in the low voltage side hold-down 32R and the low voltage side hold-down 32S.

The hold-down elastic piece 72 is described hereinafter in detail with reference to FIGS. 9 and 10. Since the hold-down elastic pieces 72 of the high voltage side hold-down 32P and the high voltage side hold-down 32Q have the same shape, the hold-down elastic piece 72 of the high voltage side hold-down 32Q is described as a representative example, and the description of the hold-down elastic piece 72 of the high voltage side hold-down 32P is omitted.

Figure 9:
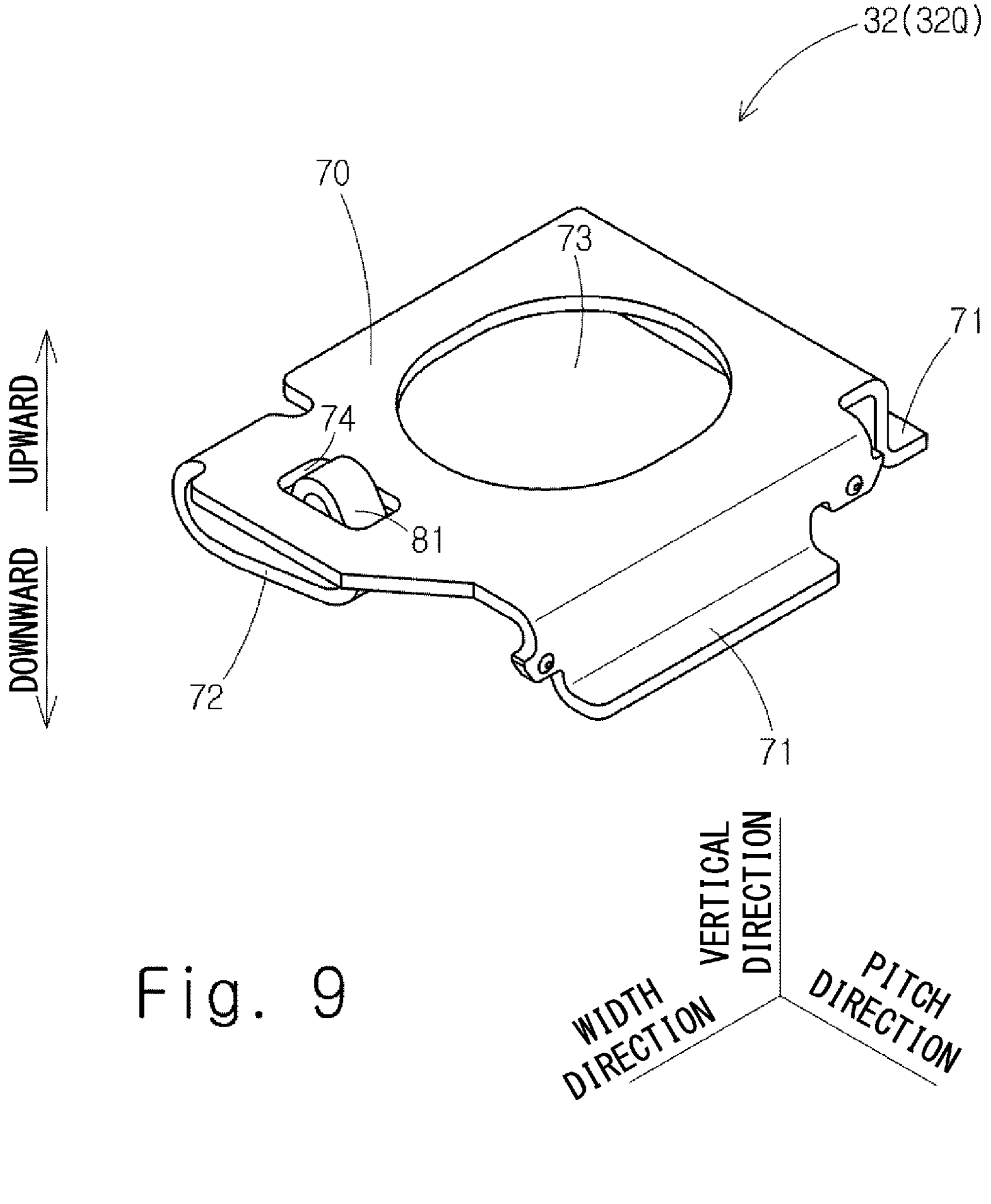
FIG. 9 is a perspective view of a hold-down (first embodiment)

FIG. 9 is a perspective view of the hold-down 32. FIG. 10 is a side view of the hold-down 32. FIG. 11 is a plan view of the hold-down 32.

Figure 10:
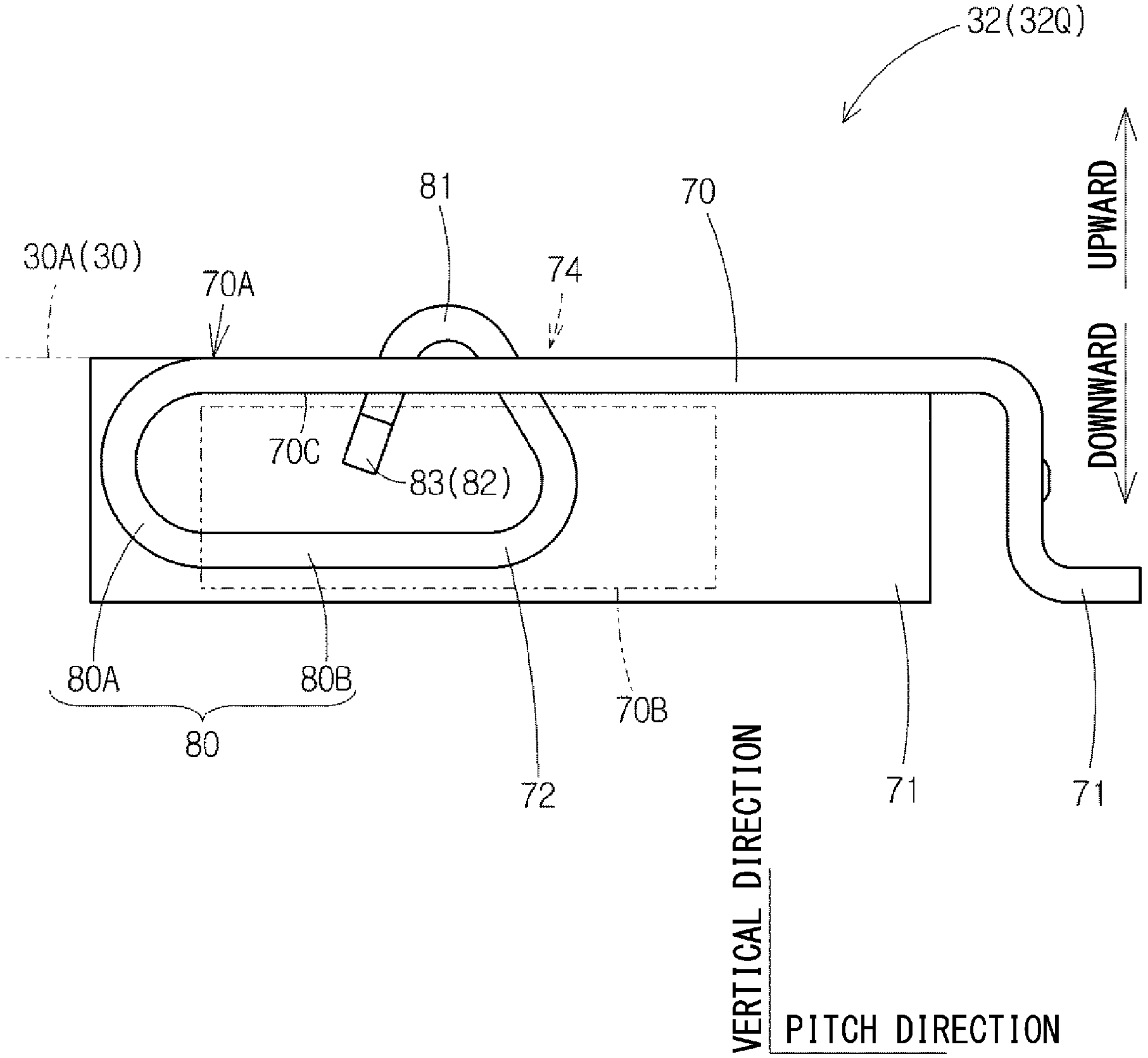
FIG. 10 is a side view of a hold-down before deformation (first embodiment)
Figure 11:
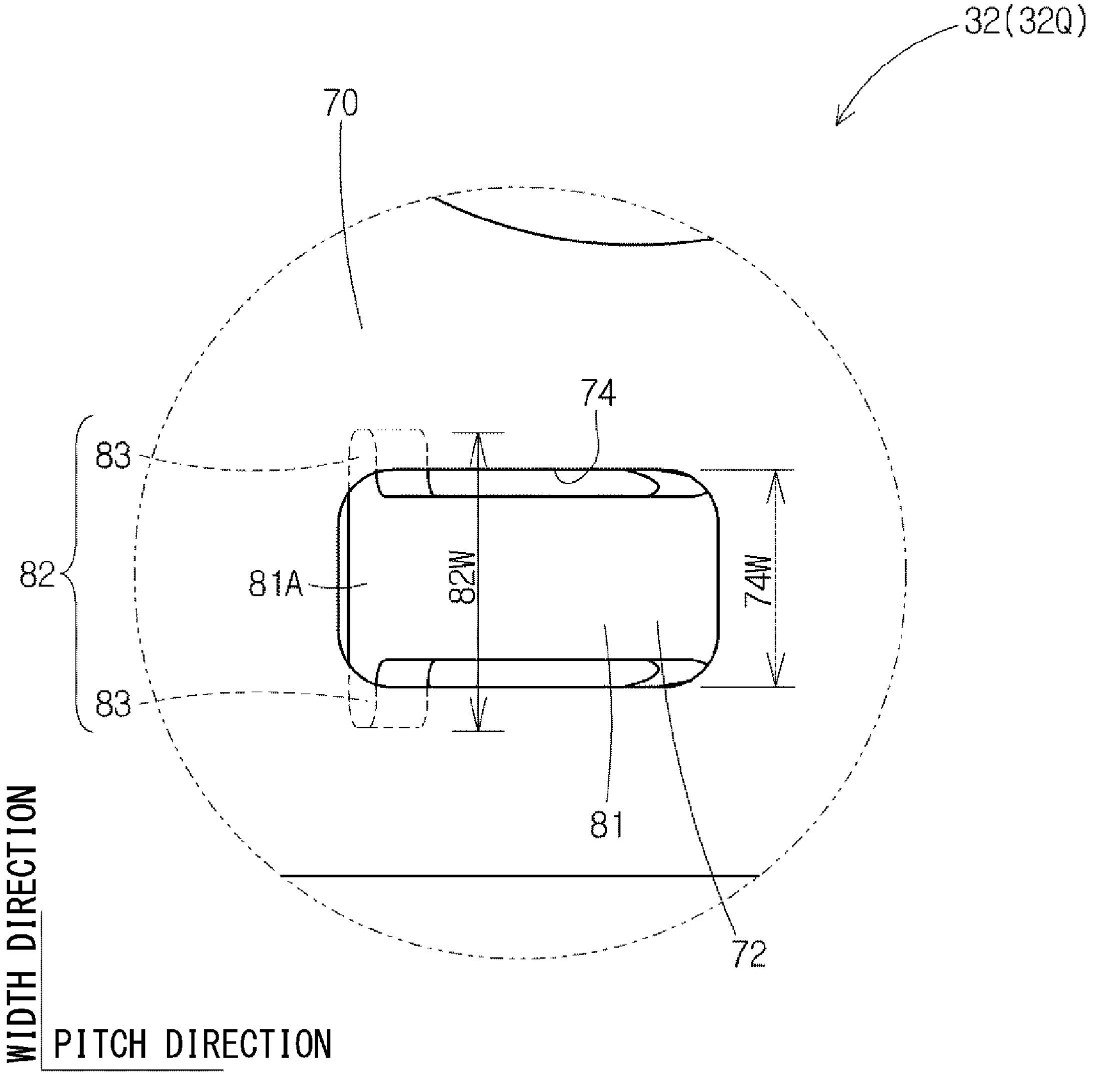
FIG. 11 is a plan view of the hold-down (first embodiment)

As shown in FIG. 10, the hold-down elastic piece 72 includes an elastic piece body 80, a contact part 81, and a displacement restriction part 82. The elastic piece body 80, the contact part 81, and the displacement restriction part 82 are continuously formed in this recited order from the base to the end of the hold-down elastic piece 72.

The elastic piece body 80 couples the contact part 81 to the reinforcing plate part 70 so as to allow elastic displacement of the contact part 81 in the vertical direction. The elastic piece body 80 extends from an end part 70A of the reinforcing plate part 70 in the pitch direction. The elastic piece body 80 extends from the end part 70A of the reinforcing plate part 70 in the pitch direction to come down into a lower space 70B of the reinforcing plate part 70. The elastic piece body 80 includes a curve part 80A and an extension part 80B sequentially from the end part 70A of the reinforcing plate part 70 to the contact part 81. The curve part 80A extends downward from the end part 70A of the reinforcing plate part 70 and also curved in a semicircular arc that is convex toward the pitch direction. The extension part 80B extends linearly in the pitch direction from the curve part 80A. The extension part 80B may extend parallel to the pitch direction or may be slightly tilted from the pitch direction. The extension part 80B extends in the lower space 70B of the reinforcing plate part 70 indicated by a chain double-dashed line.

The contact part 81 is a part that comes into contact with the power supply pad 7 of the connector opposed surface 2A of the CPU board 2 shown in FIG. 2 when the CPU board 2 is pressed against the connector 3. The contact part 81 is disposed above the elastic piece body 80. Specifically, the contact part 81 is formed to be opposed to the elastic piece body 80 in the vertical direction. The contact part 81 is formed to come closer to the curve part 80A from the end of the extension part 80B. The contact part 81 is bent in a V shape that is convex upward and inserted into the elastic piece insertion hole 74 of the reinforcing plate part 70. Before assembly of the information processing device 1, i.e., when no load is imposed on the hold-down elastic piece 72, the contact part 81 projects upward beyond the CPU board opposed surface 30A of the housing 30 indicated by a chain double-dashed line in FIG. 10.

The displacement restriction part 82 restricts upward elastic displacement of the contact part 81. In this embodiment, the displacement restriction part 82 restricts upward displacement of the contact part 81 that exceeds a predetermined value of displacement. As shown in FIG. 11, the displacement restriction part 82 includes a pair of projecting parts 83. The pair of projecting parts 83 project in opposite directions to each other in the width direction from an end 81A of the contact part 81. Thus, the pair of projecting parts 83 are opposed to a lower surface 70C of the reinforcing plate part 70 shown in FIG. 10 in the vertical direction before assembly of the information processing device 1, i.e., when no load is imposed on the hold-down elastic piece 72. As shown in FIG. 11, a dimension 82W in the width direction of the displacement restriction part 82 is larger than a dimension 74W in the width direction of the elastic piece insertion hole 74. When, in this state, the contact part 81 is drawn upward due to a certain cause such as entanglement of hands, fingers or clothing of an assembly worker around the contact part 81, the pair of projecting parts 83 also move upward to come into contact with the lower surface 70C of the reinforcing plate part 70 shown in FIG. 10. This restricts any more upward displacement of the contact part 81, and thereby prevents curling deformation of the hold-down elastic piece 72. When deformation of the hold-down elastic piece 72 when the pair of projecting parts 83 come into contact with the lower surface 70C of the reinforcing plate part 70 is within the elastic range of the hold-down elastic piece 72, damage of the hold-down elastic piece 72 due to drawing the contact part 81 upward is minimized.

Figure 12:
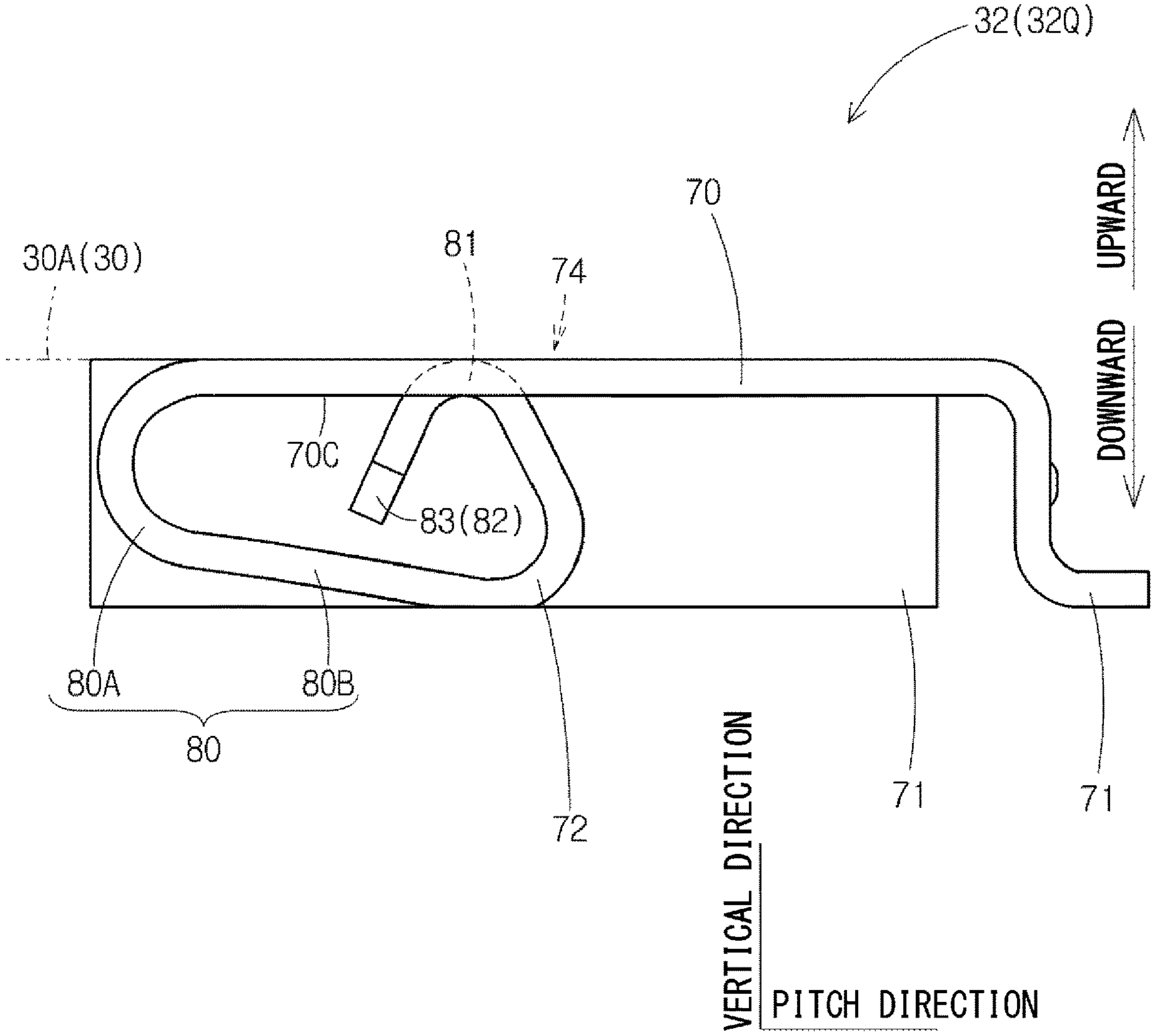
FIG. 12 is a side view of the hold-down after deformation (first embodiment)

When the CPU board 2 is pressed against the connector 3, the contact part 81 comes into contact with the corresponding power supply pad 7 of the connector opposed surface 2A of the CPU board 2 shown in FIG. 2, and also the contact part 81 is elastically displaced downward as shown in FIG. 12. At this time, the elastic piece body 80 is mainly bent downward.

As a result that the contact part 81 is elastically displaced downward, the contact part 81 no longer projects upward beyond the CPU board opposed surface 30A, and thereby the contact part 81 does not come into contact with the housing 30. This is because the hold-down accommodation recess 62Q has the insertion hole 62Q2, and the hold-down elastic piece 72 is accommodated in the insertion hole 62Q2 as shown in FIG. 5. Specifically, because of the presence of the insertion hole 62Q2 that penetrates the housing 30 in the vertical direction, the hold-down elastic piece 72 and the housing 30 do not physically interfere with each other when the hold-down elastic piece 72 is elastically deformed. Note that, instead of forming the insertion hole 62Q2 in the hold-down accommodation recess 62Q, a notch to accommodate the hold-down elastic piece 72 may be formed in the hold-down accommodation recess 62Q.

Although the displacement restriction part 82 includes the pair of projecting parts 83, one of the pair of projecting parts 83 may be omitted. Further, although the pair of projecting parts 83 project in the width direction from the contact part 81, the pair of projecting parts 83 may project in the pitch direction from the contact part 81.

Further, the pair of projecting parts 83 that constitute the displacement restriction part 82 may be not opposed to the lower surface 70C of the reinforcing plate part 70 in the vertical direction when no load is imposed on the hold-down elastic piece 72. Specifically, the displacement restriction part 82 may be opposed to the lower surface 70C of the reinforcing plate part 70 in the vertical direction only after the contact part 81 is drawn upward.

Further, the pair of projecting parts 83 that constitute the displacement restriction part 82 may be already in contact with the lower surface 70C of the reinforcing plate part 70 before assembly of the information processing device 1.

Each of the contacts 33 and each of the contact accommodation parts 63 are described hereinafter with reference to FIG. 13.

Figure 13:
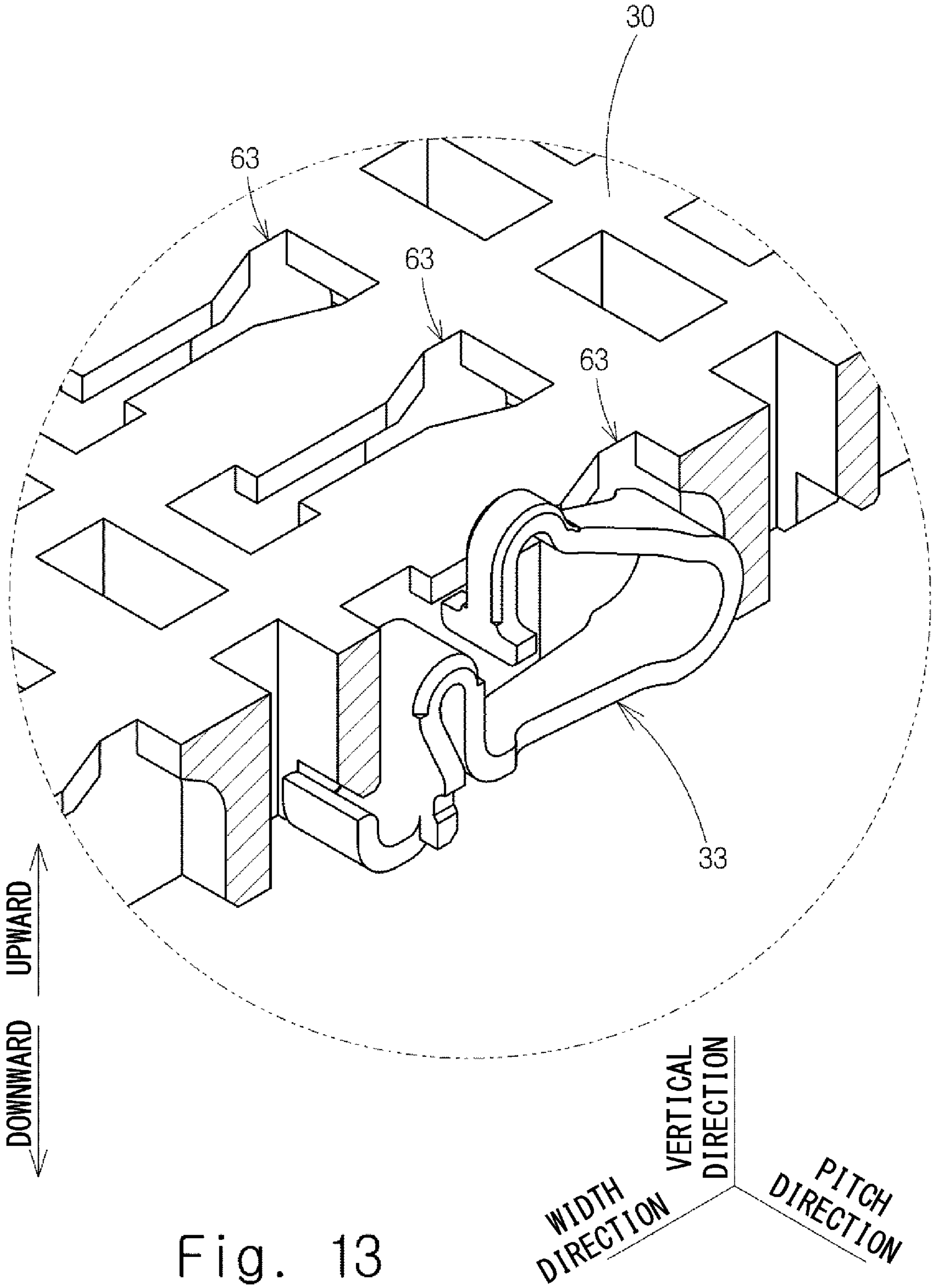
FIG. 13 is a partially cutout perspective view of the housing to which a contact is attached (first embodiment)
Figure 14:
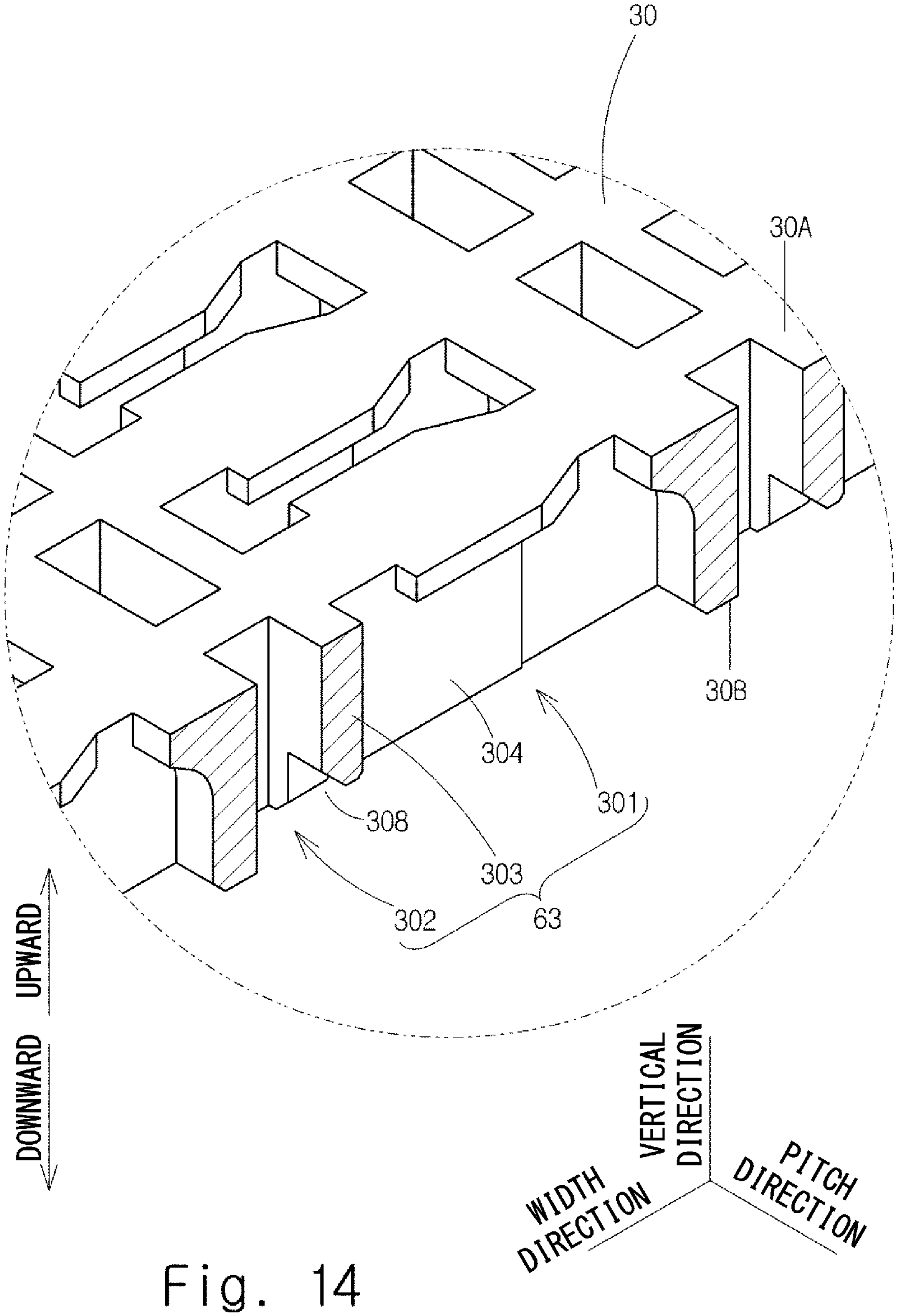
FIG. 14 is a partially cutout perspective view of the housing (first embodiment)

As shown in FIG. 13, each contact accommodation part 63 is formed to attach each contact 33 to the housing 30. As shown in FIG. 14, each contact accommodation part 63 is composed of a press-fitting space 301, a solder connection checking hole 302, and a separating wall 303. The press-fitting space 301 and the solder connection checking hole 302 are formed apart from each other in the width direction. The separating wall 303 is a wall that separates the press-fitting space 301 and the solder connection checking hole 302 in the width direction.

Figure 15:
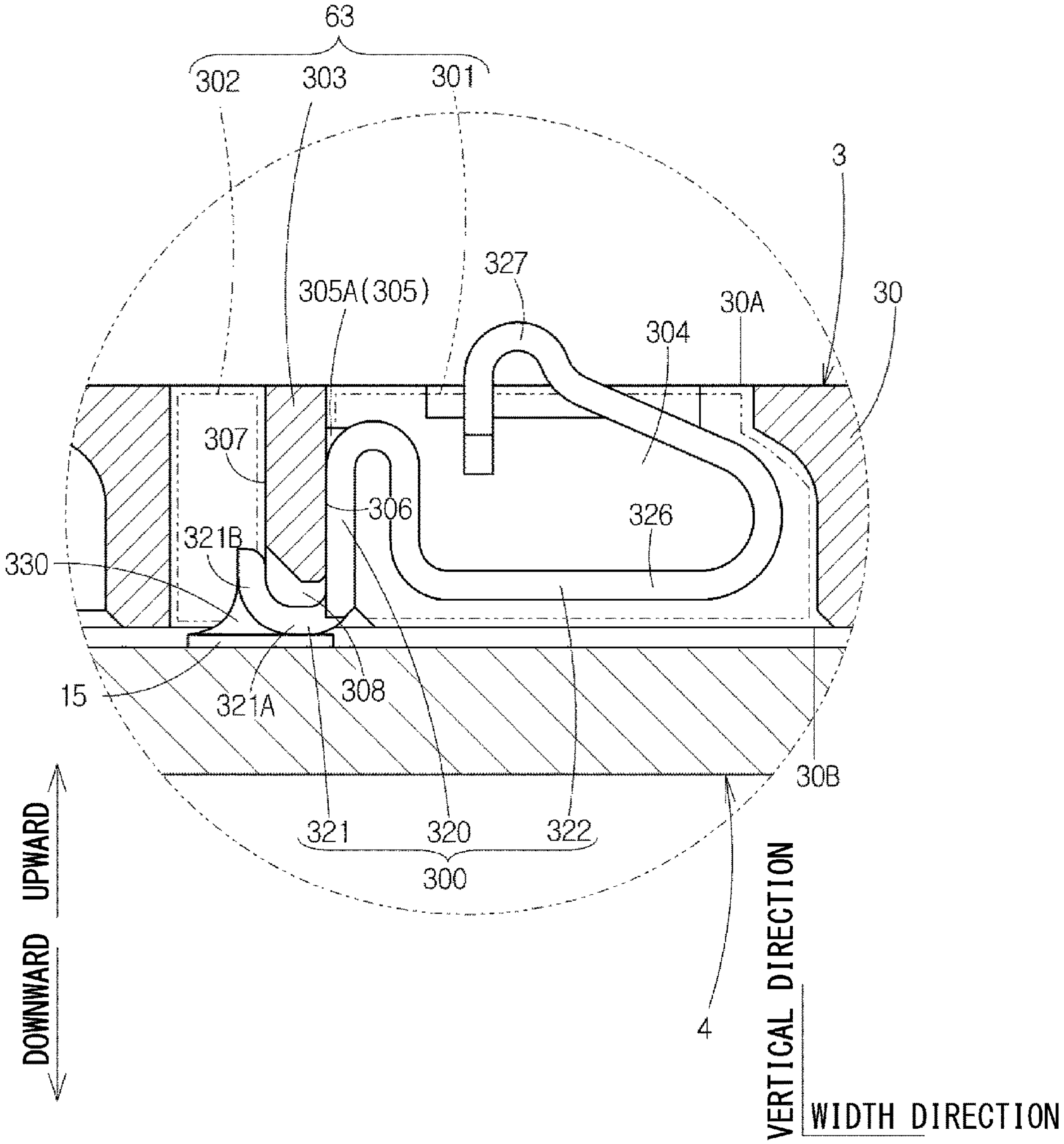
FIG. 15 is a partial cross-sectional view of the housing to which the contact is attached (first embodiment)

The press-fitting space 301 is formed as a penetrating hole that penetrates the housing 30 in the vertical direction. Specifically, the press-fitting space 301 is open to the CPU board opposed surface 30A and the input/output board opposed surface 30B. The housing 30 includes, for each press-fitting space 301, two pitch partition surfaces 304 that partition the press-fitting space 301 in the pitch direction. FIG. 14 shows only one of the two pitch partition surfaces 304. In FIG. 15, the cross-sectional shapes of the press-fitting space 301 and the solder connection checking hole 302 are specified by chain double-dashed lines. As shown in FIG. 15, a press-fit groove 305 that extends in the vertical direction is formed on each pitch partition surface 304. Each pitch partition surface 304 includes a press-fit surface 305A that partitions the press-fit groove 305 in the pitch direction.

Referring back to FIG. 14, the solder connection checking hole 302 is a penetrating hole that penetrates the housing 30 in the vertical direction. Specifically, the solder connection checking hole 302 is open to the CPU board opposed surface 30A and the input/output board opposed surface 30B.

The separating wall 303 is a wall that spatially separates the press-fitting space 301 and the solder connection checking hole 302 as described above, and it is formed between the press-fitting space 301 and the solder connection checking hole 302. As shown in FIG. 15, the separating wall 303 includes a first separating surface 306 that partitions the press-fitting space 301 in the width direction, and a second separating surface 307 that partitions the solder connection checking hole 302 in the width direction. The first separating surface 306 and the second separating surface 307 are surfaces orthogonal to the width direction. As shown in FIGS. 14 and 15, the separating wall 303 has a notch 308 that is open to the press-fitting space 301 and the solder connection checking hole 302 and is also open to the input/output board opposed surface 30B. The notch 308 is formed at the lower end of the separating wall 303.

Figure 16:
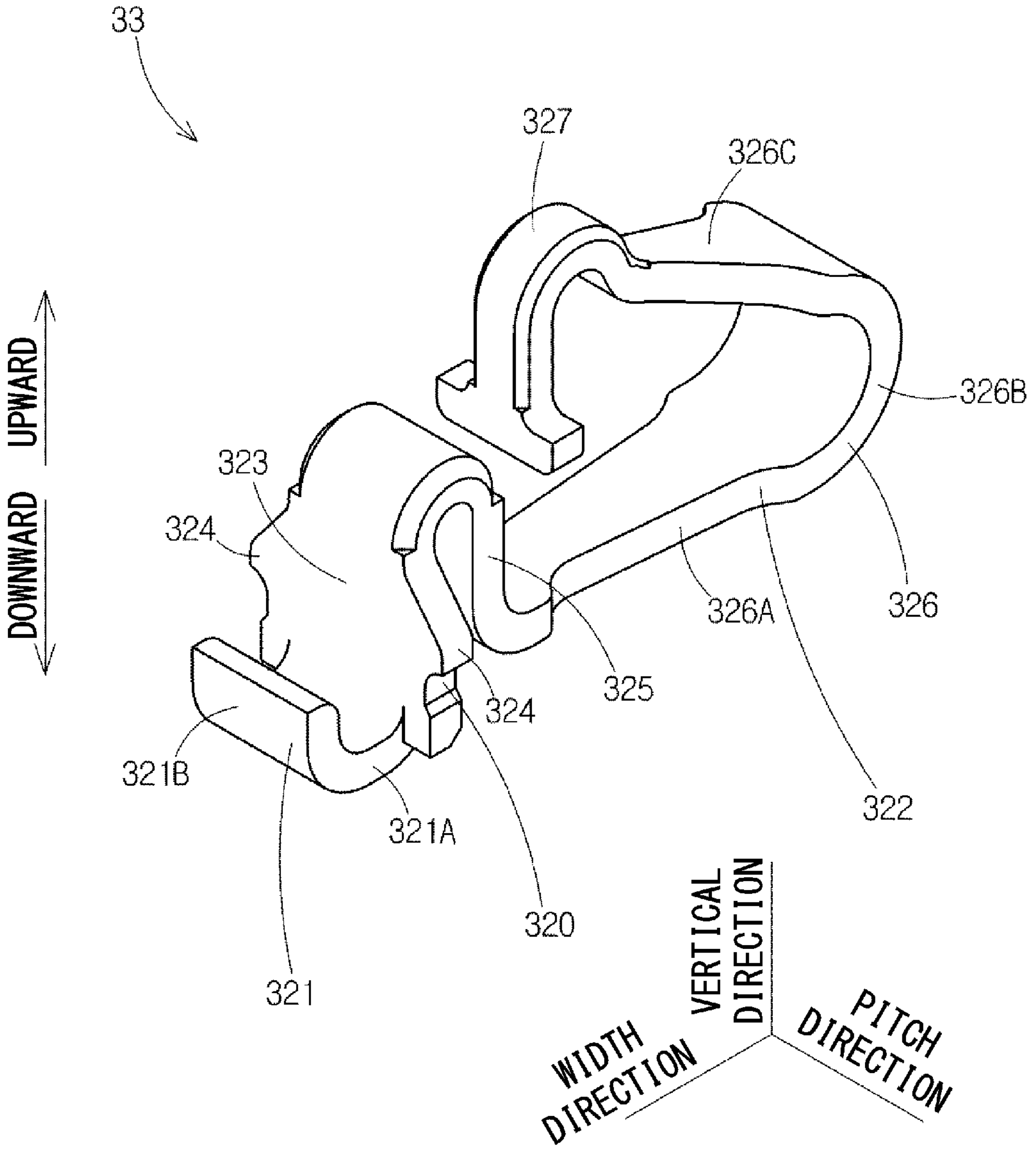
FIG. 16 is a perspective view of the contact (first embodiment)

FIG. 16 is a perspective view of each contact 33. As shown in FIG. 16, each contact 33 includes a press-fit part 320, a soldering part 321, and an electrical contact spring piece 322.

The press-fit part 320 is a part to be press-fit into the press-fitting space 301 shown in FIG. 15. Specifically, the press-fit part 320 is press-fit into the press-fitting space 301, and thereby each contact 33 is held by the housing 30. Referring back to FIG. 16, the press-fit part 320 is a plate body that is orthogonal to the width direction, and it includes a press-fit part main body 323 and two press-fit lances 324. The two press-fit lances 324 are formed to project in the pitch direction respectively from the both ends of the press-fit part main body 323 in the pitch direction.

The soldering part 321 is a part to be soldered to the corresponding signal pad 15 of the input/output board 4 shown in FIG. 1. As shown in FIG. 16, the soldering part 321 includes a horizontal extension part 321A that extends in the width direction from the lower end of the press-fit part 320 and a curve part 321B that curves upward from the horizontal extension part 321A.

The electrical contact spring piece 322 is a part that functions as an electrical contact point of the CPU board 2 shown in FIG. 2 with the corresponding signal pad 10. As shown in FIG. 16, the electrical contact spring piece 322 includes a spring piece joining part 325, an easily elastically deformable part 326, and a contact part 327. The spring piece joining part 325, the easily elastically deformable part 326, and the contact part 327 are continuously formed in this recited order.

The spring piece joining part 325 extends downward from the upper end of the press-fit part 320.

The easily elastically deformable part 326 extends from the lower end of the spring piece joining part 325 and is formed in a U-shape that is convex in the width direction. Specifically, the easily elastically deformable part 326 includes a lower straight part 326A, a curve part 326B, and an upper straight part 326C. The lower straight part 326A, the curve part 326B, and the upper straight part 326C are continuously formed in this recited order. The lower straight part 326A and the upper straight part 326C are opposed to each other in the vertical direction. The lower straight part 326A and the upper straight part 326C are joined through the curve part 326B.

The contact part 327 is a part that can come into electrical contact with the corresponding signal pad 10 of the CPU board 2 shown in FIG. 2. As shown in FIG. 16, the contact part 327 is placed at the end of the upper straight part 326C of the easily elastically deformable part 326, and it curves to be convex upward.

FIG. 15 shows the state where each contact 33 is attached to each contact accommodation part 63. In order to attach each contact 33 to each contact accommodation part 63, each contact 33 is press-fit into the press-fitting space 301 of each contact accommodation part 63 from below. At this time, the two press-fit lances 324 of the press-fit part 320 shown in FIG. 16 respectively bite into the two pitch partition surfaces 304. In more detail, each of the two press-fit lances 324 of the press-fit part 320 shown in FIG. 16 bites into the press-fit surface 305A of the press-fit groove 305 formed on the two pitch partition surfaces 304.

Referring back to FIG. 15, when each contact 33 is attached to each contact accommodation part 63, the easily elastically deformable part 326 is accommodated in the press-fitting space 301, and the contact part 327 thereby projects upward from the CPU board opposed surface 30A. Further, the soldering part 321 passes through the notch 308 and reaches the solder connection checking hole 302. In more detail, the horizontal extension part 321A of the soldering part 321 extends in the width direction inside the notch 308, and the curve part 321B is located in the solder connection checking hole 302. In this state, while the press-fit part 320 comes into contact with the separating wall 303 of the housing 30, the soldering part 321 and the electrical contact spring piece 322 do not come into contact with the housing 30.

FIG. 15 shows the state where the soldering part 321 is soldered to the corresponding signal pad 15 of the input/output board 4. As shown in FIG. 15, when the soldering part 321 is connected by solder to the signal pad 15, a solder fillet 330 is formed between the curve part 321B of the soldering part 321 and the signal pad 15. In general, the soldering part 321 is regarded as being normally soldered to the signal pad 15 upon formation of the solder fillet 330. Thus, in this embodiment, the housing 30 is provided with the solder connection checking hole 302, so that the presence of the solder fillet 330 is checked from above through the solder connection checking hole 302. This enables determining whether the soldering of each contact 33 is successfully made or not after mounting the connector 3 onto the input/output board 4.

In this embodiment, the separating wall 303 that separates the press-fitting space 301 and the solder connection checking hole 302 is formed as described above. The presence of the separating wall 303 prevents shavings of the housing 30, which can be generated when press-fitting the press-fit part 320 into the press-fitting space 301, from moving into the solder connection checking hole 302. This allows checking the solder fillet 330 from above through the solder connection checking hole 302 with no problem.

The first embodiment is described above, and the above-described embodiment has the following features.

As shown in FIGS. 1 and 2, the connector 3 (board-to-board connector) is mounted on the input/output board 4 (first board) and interposed between the input/output board 4 and the CPU board 2 (second board), and thereby the plurality of signal pads 15 (pads) of the input/output board 4 and the plurality of signal pads 10 (pads) of the CPU board 2 are respectively electrically connected. As shown in FIGS. 3 and 4, the connector 3 includes the flat-plate housing 30, the plurality of contacts 33 held on the housing 30, and the high voltage side hold-down 32Q (hold-down) made of metal. As shown in FIGS. 1 and 5, the housing 30 includes the input/output board opposed surface 30B (housing lower surface) that is opposed to the input/output board 4 when the connector 3 is mounted on the input/output board 4, and the CPU board opposed surface 30A (housing upper surface) being the opposite of the input/output board opposed surface 30B. As shown in FIG. 5, on the CPU board opposed surface 30A, the hold-down accommodation recess 62Q is formed. As shown in FIG. 8, the high voltage side hold-down 32Q includes the flat-plate shaped reinforcing plate part 70 that is accommodated in the hold-down accommodation recess 62Q and coverts the inner bottom surface 62Q1 of the hold-down accommodation recess 62Q, the solder legs 71 that project downward from the reinforcing plate part 70, and the hold-down elastic piece 72 that is supported like a cantilever beam by the reinforcing plate part 70. As shown in FIG. 10, the hold-down elastic piece 72 includes the elastic piece body 80, the contact part 81 that projects upward beyond the CPU board opposed surface 30A, and the displacement restriction part 82 that restricts upward displacement of the contact part 81, sequentially from the base to the end of the hold-down elastic piece 72. The housing 30 is formed in such a way that the contact part 81 does not come into contact with the housing 30 when the contact part 81 no longer projects upward beyond the CPU board opposed surface 30A as a result that the contact part 81 is displaced downward as shown in FIG. 12. This structure achieves a structure in which the contact part 81 of the hold-down elastic piece 72 provided in the hold-down 32 is easily elastically displaceable and prevents curling deformation of the hold-down elastic piece 72 by the displacement restriction part 82.

The displacement restriction part 82 restricts upward displacement of the contact part 81 that exceeds a predetermined value of displacement. In this structure, no load is imposed on the hold-down elastic piece 72 before use of the connector 3.

The displacement restriction part 82 restricts upward displacement of the contact part 81 by coming into contact with the reinforcing plate part 70. In this structure, the displacement restriction part 82 restricts upward displacement of the contact part 81 more reliably compared with the case of restricting upward displacement of the contact part 81 by coming into contact with the housing 30.

The displacement restriction part 82 restricts upward displacement of the contact part 81 by coming into contact with the lower surface 70C of the reinforcing plate part 70 shown in FIG. 10. In this structure, there is no need for any special structure for the high voltage side hold-down 32Q to come into contact with the displacement restriction part 82, and therefore the high voltage side hold-down 32Q in a simple structure is achieved.

The displacement restriction part 82 is opposed to the lower surface 70C of the reinforcing plate part 70 in the vertical direction. In this structure, the displacement restriction part 82 reliably comes into contact with the lower surface 70C of the reinforcing plate part 70 when the contact part 81 is displaced upward.

The displacement restriction part 82 includes the projecting part 83 that projects in the width direction, which is the direction orthogonal to the longitudinal direction of the contact part 81. The projecting part 83 is opposed to the lower surface 70C of the reinforcing plate part 70 in the vertical direction. In this structure, the displacement restriction part 82 more reliably comes into contact with the lower surface 70C of the reinforcing plate part 70 when the contact part 81 is displaced upward.

As shown in FIGS. 8 to 11, the reinforcing plate part 70 has the elastic piece insertion hole 74 into which the contact part 81 is inserted. The displacement restriction part 82 includes the pair of projecting parts 83 that project in opposite directions to each other in the width direction, which is the direction orthogonal to the longitudinal direction of the contact part 81. The pair of projecting parts 83 are opposed to the lower surface 70C of the reinforcing plate part 70 in the vertical direction. In this structure, the displacement restriction part 82 more reliably comes into contact with the lower surface 70C of the reinforcing plate part 70 when the contact part 81 is displaced upward.

As shown in FIG. 10, the contact part 81 is bent to be convex upward. In this structure, the wiping effect of the contact part 81 on the corresponding signal pad 10 of the CPU board 2 shown in FIG. 2 is properly exerted.

As shown in FIG. 10, at least part of the elastic piece body 80 extends in the lower space 70B of the reinforcing plate part 70. In this embodiment, the extension part 80B of the elastic piece body 80 extends in the lower space 70B of the reinforcing plate part 70. Specifically, even if the cross-sectional area of the elastic piece body 80 is large, the easiness of elastic displacement of the contact part 81 is not hindered as long as the length of the elastic piece body 80 is sufficient. If the cross-sectional area of the elastic piece body 80 is large, the allowable current of the elastic piece body 80 can be set to high. However, if the length of the elastic piece body 80 is large, the size of the connector 3 when viewed from above increases accordingly. Therefore, this structure achieves both reduction of size of the connector 3 when viewed from above and high allowable current of the elastic piece body 80.

As shown in FIG. 8, the inner bottom surface 62Q1 of the hold-down accommodation recess 62Q has the second positioning hole 34Q (positioning hole). The reinforcing plate part 70 is formed to cover the inner bottom surface 62Q1 of the hold-down accommodation recess 62Q around the second positioning hole 34Q. This structure reduces the amount of deformation when the second positioning hole 34Q is deformed outward in the radial direction and thereby avoids a significant decrease in positioning accuracy by the second positioning hole 34Q.

As shown in FIG. 8, the reinforcing plate part 70 is formed so as not to cover the inner edge 34QE of the second positioning hole 34Q. In this structure, the positioning function by the inner edge 34QE of the second positioning hole 34Q is not hindered.

Although the first embodiment is described above, the first embodiment can be modified as follows.

Although the connector 3 includes the four hold-downs 32, the connector 3 may include only two hold-downs 32 or one hold-down 32.

Although the connector 3 includes the plurality of contacts 33, the connector 3 may include only one contact 33.

Second Embodiment

Figure 17:
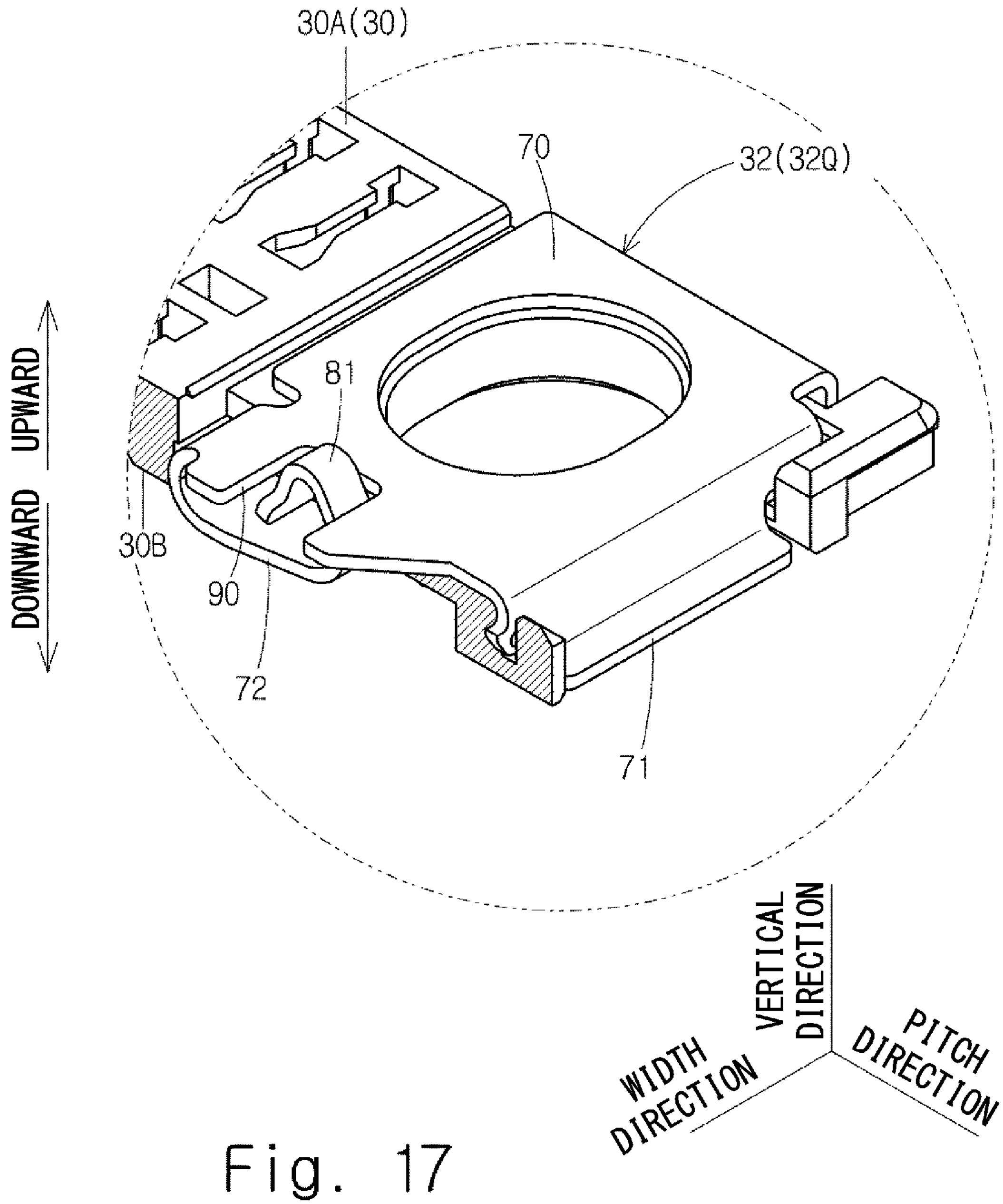
FIG. 17 is a partially cutout perspective view of a housing to which a hold-down is attached (second embodiment)

A second embodiment is described hereinafter with reference to FIG. 17. Hereinafter, differences of this embodiment from the above-described first embodiment are mainly described, and redundant description is omitted. FIG. 17 is a partially cutout perspective view of the connector 3.

In the above-described first embodiment, as shown in FIG. 9, the reinforcing plate part 70 has the elastic piece insertion hole 74, and the contact part 81 of the hold-down elastic piece 72 is inserted into the elastic piece insertion hole 74.

In this embodiment, as shown in FIG. 17, the reinforcing plate part 70 has an elastic piece insertion notch 90, and the contact part 81 of the hold-down elastic piece 72 is inserted into the elastic piece insertion notch 90. This structure contributes to weight reduction of the hold-down 32.

Third Embodiment

Figure 18:
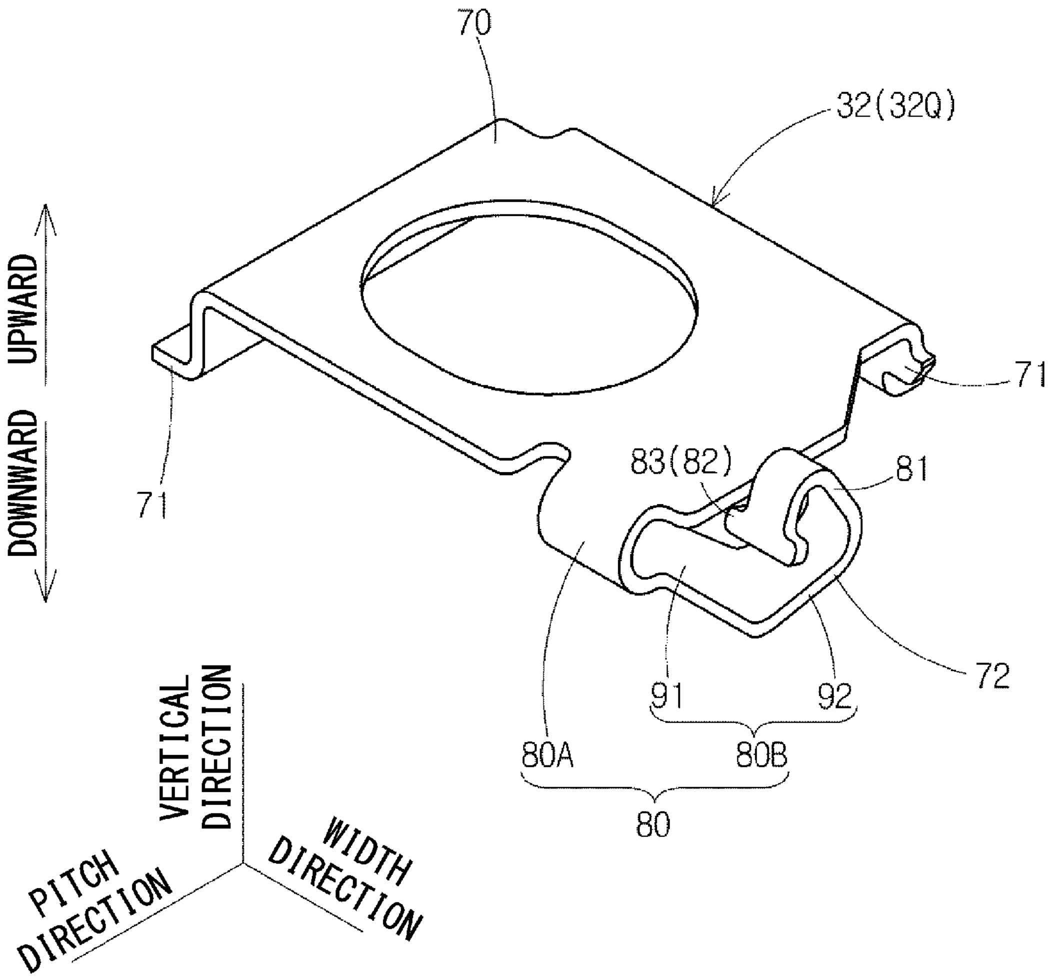
FIG. 18 is a perspective view of a hold-down (third embodiment)

A third embodiment is described hereinafter with reference to FIG. 18. Hereinafter, differences of this embodiment from the above-described first embodiment are mainly described, and redundant description is omitted. FIG. 18 is a perspective view of the hold-down 32.

In the above-described embodiment, as shown in FIG. 9, the reinforcing plate part 70 has the elastic piece insertion hole 74, and the contact part 81 of the hold-down elastic piece 72 is inserted into the elastic piece insertion hole 74.

In this embodiment, as shown in FIG. 18, the elastic piece insertion hole 74 of the reinforcing plate part 70 is omitted. The extension part 80B of the elastic piece body 80 of the hold-down elastic piece 72 is formed in an L-shape when viewed from above including a first extension part 91 that extends in the width direction from the lower end of the curve part 80A and a second extension part 92 that extends in the pitch direction from the end of the first extension part 91. The second extension part 92 and the contact part 81 are not opposed to the reinforcing plate part 70 in the vertical direction and disposed at positions different from the reinforcing plate part 70 in the width direction. In this structure, a working space when bending the contact part 81 is sufficiently large, and therefore the manufacturing cost of the hold-down elastic piece 72 is reduced.

Fourth Embodiment

Figure 19:
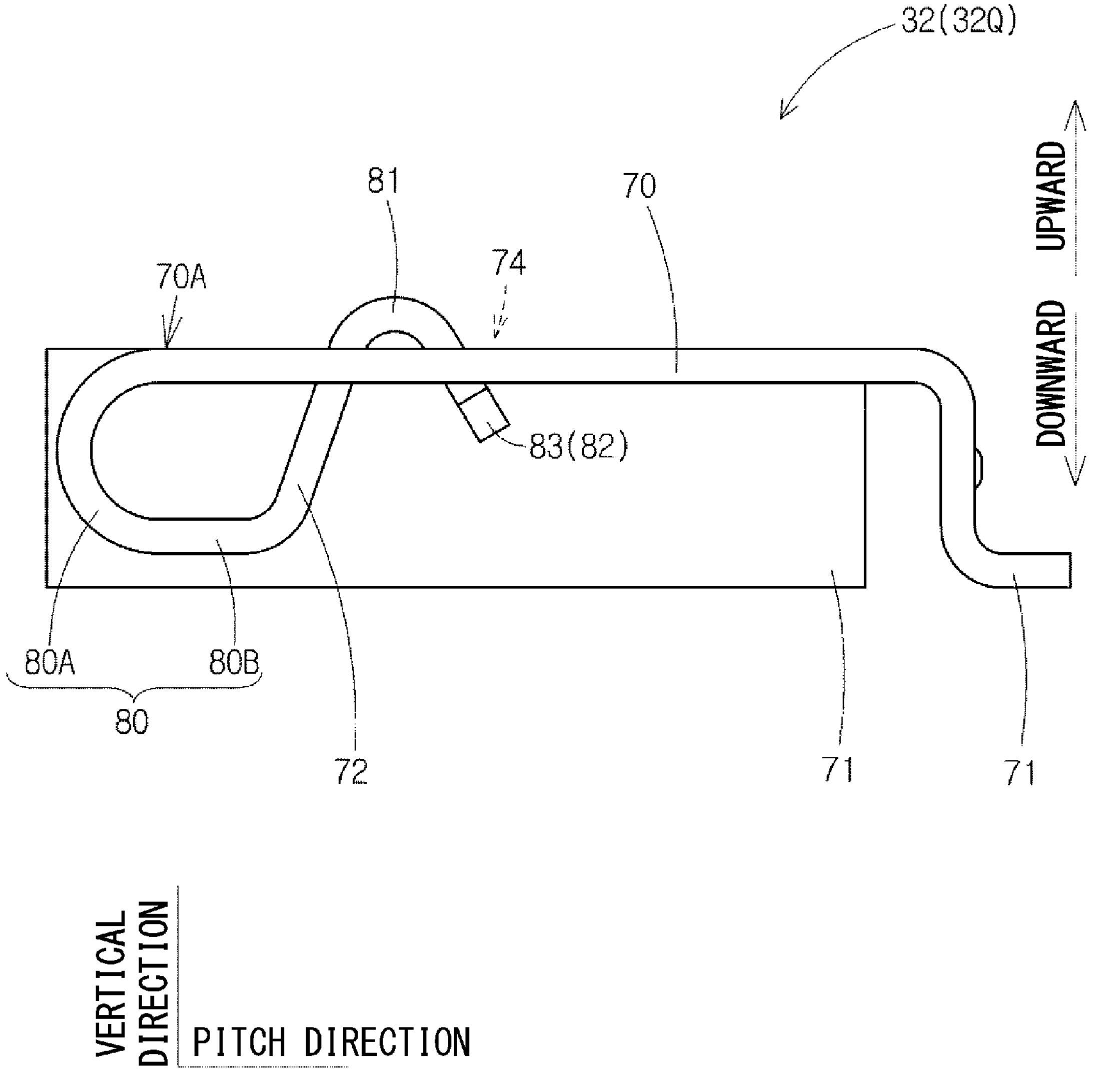
FIG. 19 is a side view of a hold-down (fourth embodiment)
Figure 20:
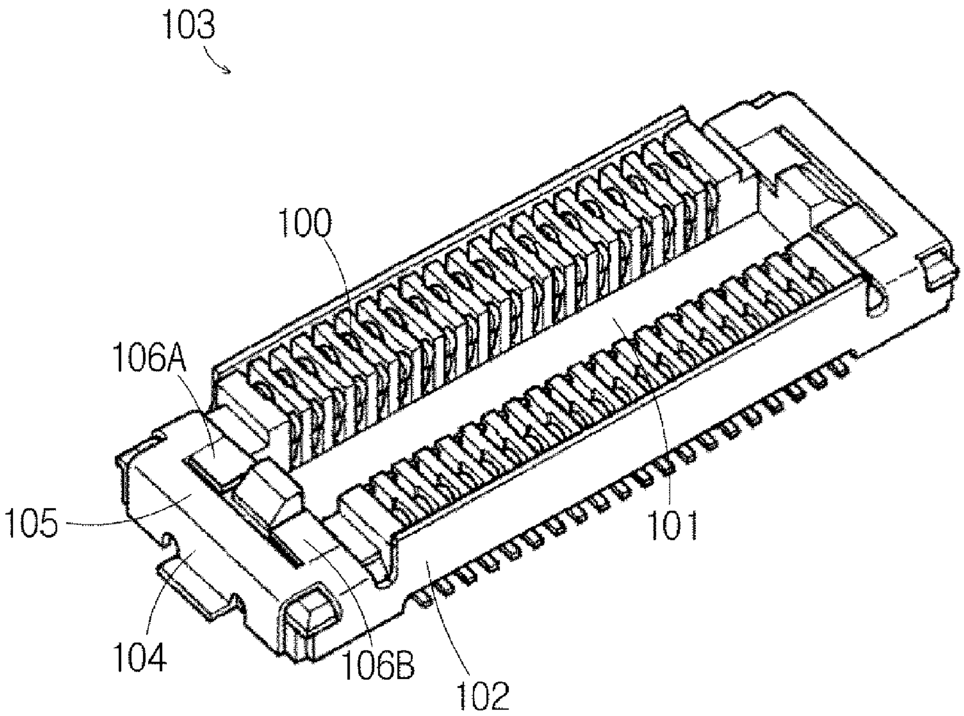
FIG. 20 is a view showing a simplified version of FIG. 1 of Japanese Unexamined Patent Application Publication No. 2006-156023.

A fourth embodiment is described hereinafter with reference to FIG. 19. Hereinafter, differences of this embodiment from the above-described first embodiment are mainly described, and redundant description is omitted. FIG. 19 is a side view of the hold-down 32.

In the above-described first embodiment, as shown in FIG. 10, the contact part 81 is opposed to the elastic piece body 80 in the vertical direction.

In this embodiment, as shown in FIG. 19, the contact part 81 is not opposed to the elastic piece body 80 in the vertical direction, and is disposed at a position different from the elastic piece body 80 in the pitch direction. Specifically, the elastic piece body 80 and the contact part 81 form an S shape when viewed from side. In this structure, since the contact part 81 is away from the curve part 80A serving as a substantive supporting point of elastic deformation of the hold-down elastic piece 72 in the pitch direction, the moment by a pressing down force that acts downward on the contact part 81 increases, which allows the hold-down elastic piece 72 to be easily elastically deformable.

The first through forth embodiments can be combined as desirable by one of ordinary skill in the art.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A board-to-board connector to be mounted on a first board and interposed between the first board and a second board to electrically connect a plurality of pads of the first board to a plurality of pads of the second board, comprising:

a flat-plate housing;

a plurality of contacts held on the housing; and a hold-down made of metal, wherein the housing includes a housing lower surface to be opposed to the first board when the board-to-board connector is mounted on the first board and a housing upper surface being an opposite of the housing lower surface, a hold-down accommodation recess is formed on the housing upper surface, the hold-down accommodation recess including an insertion hole or notch therein;

the hold-down includes:

a flat-plate reinforcing plate part to be accommodated in the hold-down accommodation recess and cover an inner bottom surface of the hold-down accommodation recess;

a solder leg projecting downward from the reinforcing plate part; and a hold-down elastic piece supported like a cantilever beam by the reinforcing plate part, the hold-down elastic piece includes, sequentially from a base to an end of the hold-down elastic piece:

an elastic piece body;

a contact part projecting upward beyond the housing upper surface; and a displacement restriction part to restrict upward displacement of the contact part, wherein the hold-down elastic piece is accommodated in the insertion hole or notch of the hold-down accommodation recess, and the housing is formed in such a way that the contact part does not come into contact with the housing when the contact part is displaced downward and no longer projects upward beyond the housing upper surface.

2. The board-to-board connector according to claim 1, wherein the displacement restriction part restricts upward displacement exceeding a predetermined value, of the contact part.

3. The board-to-board connector according to claim 1, wherein the displacement restriction part restricts upward displacement of the contact part by coming into contact with the reinforcing plate part.

4. The board-to-board connector according to claim 1, wherein the displacement restriction part restricts upward displacement of the contact part by coming into contact with a lower surface of the reinforcing plate part.

5. The board-to-board connector according to claim 4, wherein the displacement restriction part is opposed to the lower surface of the reinforcing plate part in a vertical direction.

6. The board-to-board connector according to claim 5, wherein the displacement restriction part includes a projecting part projecting in a direction orthogonal to a longitudinal direction of the contact part, and the projecting part is opposed to the lower surface of the reinforcing plate part in the vertical direction.

7. The board-to-board connector according to claim 5, wherein the reinforcing plate part has an elastic piece insertion hole into which the contact part is inserted, the displacement restriction part includes a pair of projecting parts projecting in a direction orthogonal to a longitudinal direction of the contact part and in opposite directions to each other, and the pair of projecting parts are opposed to the lower surface of the reinforcing plate part in the vertical direction.

8. The board-to-board connector according to claim 1, wherein the contact part is bent to be convex upward.

9. The board-to-board connector according to claim 1, wherein at least part of the elastic piece body extends in a lower space of the reinforcing plate part.

10. The board-to-board connector according to claim 1, wherein the inner bottom surface of the hold-down accommodation recess has a positioning hole, and the reinforcing plate part is formed to cover the inner bottom surface of the hold-down accommodation recess around the positioning hole.

11. The board-to-board connector according to claim 10, wherein the reinforcing plate part is formed so as not to cover an inner edge of the positioning hole.

* * * * *